US012596913B2

(12) United States Patent
Son et al.

(10) Patent No.: US 12,596,913 B2
(45) Date of Patent: Apr. 7, 2026

(54) CONVOLUTIONAL NEURAL NETWORK (CNN) PROCESSING METHOD AND APPARATUS

(71) Applicant: Samsung Electronics Co., Ltd., Suwon-si (KR)

(72) Inventors: Jinwoo Son, Seoul (KR); Changyong Son, Anyang-si (KR); Jaejoon Han, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 17/975,837

(22) Filed: Oct. 28, 2022

(65) Prior Publication Data

US 2023/0051648 A1 Feb. 16, 2023

Related U.S. Application Data

(62) Division of application No. 15/836,988, filed on Dec. 11, 2017.

(30) Foreign Application Priority Data

Mar. 28, 2017 (KR) ........................ 10-2017-0039561

(51) Int. Cl.
*G06N 3/044* (2023.01)
*G06F 17/16* (2006.01)
(Continued)

(52) U.S. Cl.
CPC .............. *G06N 3/04* (2013.01); *G06N 3/045* (2023.01); *G06N 3/08* (2013.01); *G06N 3/063* (2013.01)

(58) Field of Classification Search
CPC ........ G06N 3/0464; G06N 3/063; G06N 3/08; G06N 3/04; G06N 3/045; G06F 17/153
See application file for complete search history.

(56) References Cited

U.S. PATENT DOCUMENTS 8,051,124 B2 11/2011 Salama et al.
9,418,319 B2 8/2016 Shen et al.
(Continued)

FOREIGN PATENT DOCUMENTS

KR 10-0442835 B1 8/2004
KR 10-2007-0118806 A 12/2007
(Continued)

OTHER PUBLICATIONS

Ma, Yufei, et al. "Optimizing loop operation and dataflow in FPGA acceleration of deep convolutional neural networks." Proceedings of the 2017 ACM/SIGDA International Symposium on Field-Programmable Gate Arrays. Feb. 2017. (Year: 2017).*
(Continued)

*Primary Examiner* — Brandon S Cole
(74) *Attorney, Agent, or Firm* — NSIP Law

(57) ABSTRACT

Disclosed is a convolutional neural network (CNN) processing apparatus and method, the apparatus configured to determine a loading space unit for at least one loading space in an input based on a height or a width for an input feature map of the input and an extent of a dimension of a kernel feature map, load target input elements corresponding to a target loading space, among the at least one loading space, from a memory and store the target input elements in an allocated input buffer having a size corresponding to the loading space unit, and perform a convolution operation between the target input elements stored in the input buffer and at least one kernel element of a kernel.

13 Claims, 21 Drawing Sheets

200

Input | convolution layer 1 201 | Sub-sampling layer | convolution layer 2 202 | convolution layer 203 | fully-connected layer

(51) Int. Cl.
|  |  |
|---|---|
| *G06N 3/04* | (2023.01) |
| *G06N 3/045* | (2023.01) |
| *G06N 3/08* | (2023.01) |
| *G06N 3/063* | (2023.01) |

(56) References Cited

U.S. PATENT DOCUMENTS

| | | | |
|---|---|---|---|
| 9,582,726 B2 | 2/2017 | Pan et al. | |
| 10,339,646 B1 * | 7/2019 | Adler | G06T 7/73 |
| 10,489,680 B2 | 11/2019 | Aliabadi et al. | |
| 10,832,136 B2 | 11/2020 | Kadav et al. | |
| 11,003,985 B2 | 5/2021 | Kim et al. | |
| 2016/0217369 A1 | 7/2016 | Annapureddy et al. | |
| 2016/0335120 A1 * | 11/2016 | Gupta | G06F 9/5044 |
| 2016/0342888 A1 | 11/2016 | Yang et al. | |
| 2016/0358068 A1 | 12/2016 | Brothers et al. | |
| 2016/0358069 A1 | 12/2016 | Brothers et al. | |
| 2017/0323197 A1 | 11/2017 | Gibson et al. | |
| 2017/0344876 A1 | 11/2017 | Brothers | |
| 2018/0046894 A1 | 2/2018 | Yao | |
| 2018/0046898 A1 | 2/2018 | Lo | |
| 2018/0096226 A1 | 4/2018 | Aliabadi et al. | |
| 2018/0121533 A1 * | 5/2018 | Magnani | G06N 3/045 |
| 2019/0012424 A1 * | 1/2019 | Brookshire | H05K 3/0005 |
| 2019/0042745 A1 * | 2/2019 | Chen | G06V 20/62 |
| 2019/0108618 A1 * | 4/2019 | Hwang | G06N 3/0464 |
| 2019/0122113 A1 | 4/2019 | Chen et al. | |
| 2020/0050893 A1 * | 2/2020 | Suresh | G06T 11/40 |

FOREIGN PATENT DOCUMENTS

| | | |
|---|---|---|
| KR | 10-1676101 B1 | 11/2016 |
| KR | 10-2016-0140394 A | 12/2016 |
| KR | 10-2017-0007151 A | 1/2017 |
| WO | WO 2018/073975 A1 | 4/2018 |

OTHER PUBLICATIONS

Cavigelli, Lukas, and Luca Benini. "Origami: A 803-GOp/s/W convolutional network accelerator." IEEE Transactions on Circuits and Systems for Video Technology 27.11 (2016): 2461-2475. (Year: 2016).*

Park, Hyunsun, et al. "Zero and data reuse-aware fast convolution for deep neural networks on GPU." Proceedings of the Eleventh IEEE/ACM/IFIP International Conference on Hardware/Software Codesign and System Synthesis. 2016. (Year: 2016).*

Ma, Yufei, et al. "Optimizing loop operation and dataflow in FPGA acceleration of deep convolutional neural networks." *Proceedings of the 2017 ACM/SIGDA International Symposium on Field-Programmable Gate Arrays.* (2017). pp. 1-63.

Strigl, Daniel, et al. "Performance and scalability of GPU-based convolutional neural networks." *2010 18th Euromicro conference on parallel, distributed and network-based processing.* IEEE, (2010). pp. 1-9.

Zhang, Shijin, et al. "Cambricon-X: An accelerator for sparse neural networks." *2016 49th Annual IEEE/ACM International Symposium on Microarchitecture (MICRO).* IEEE, (2016). pp. 1-12.

Albericio, Jorge, et al. "Cnvlutin: Ineffectual-neuron-free deep neural network computing." *ACM SIGARCH Computer Architecture News* vol. 44. Issue 3 (2016). pp. 1-13.

Chen, Yu-Hsin, et al. "Eyeriss: An energy-efficient reconfigurable accelerator for deep convolutional neural networks." *IEEE journal of solid-state circuits* vol. 52. Issue 1 (2016). pp. 127-138.

Korytkowski, Marcin, et al. "Fast computing framework for convolutional neural networks." *2016 IEEE International Conferences on Big Data and Cloud Computing (BDCloud), Social Computing and Networking (SocialCom), Sustainable Computing and Communications (SustainCom)(BDCloud-SocialCom-SustainCom).* IEEE, (2016). pp. 1-6.

Kim, Dongyoung, et al. "A novel zero weight/activation-aware hardware architecture of convolutional neural network." *Design, Automation & Test in Europe Conference & Exhibition (DATE),* 2017. IEEE, (2017). pp. 1462-1467.

Parashar, Angshuman, et al. "SCNN: An accelerator for compressed-sparse convolutional neural networks." *ACM SIGARCH computer architecture news* 45.2 (2017). pp. 27-40.

* cited by examiner

FIG. 1

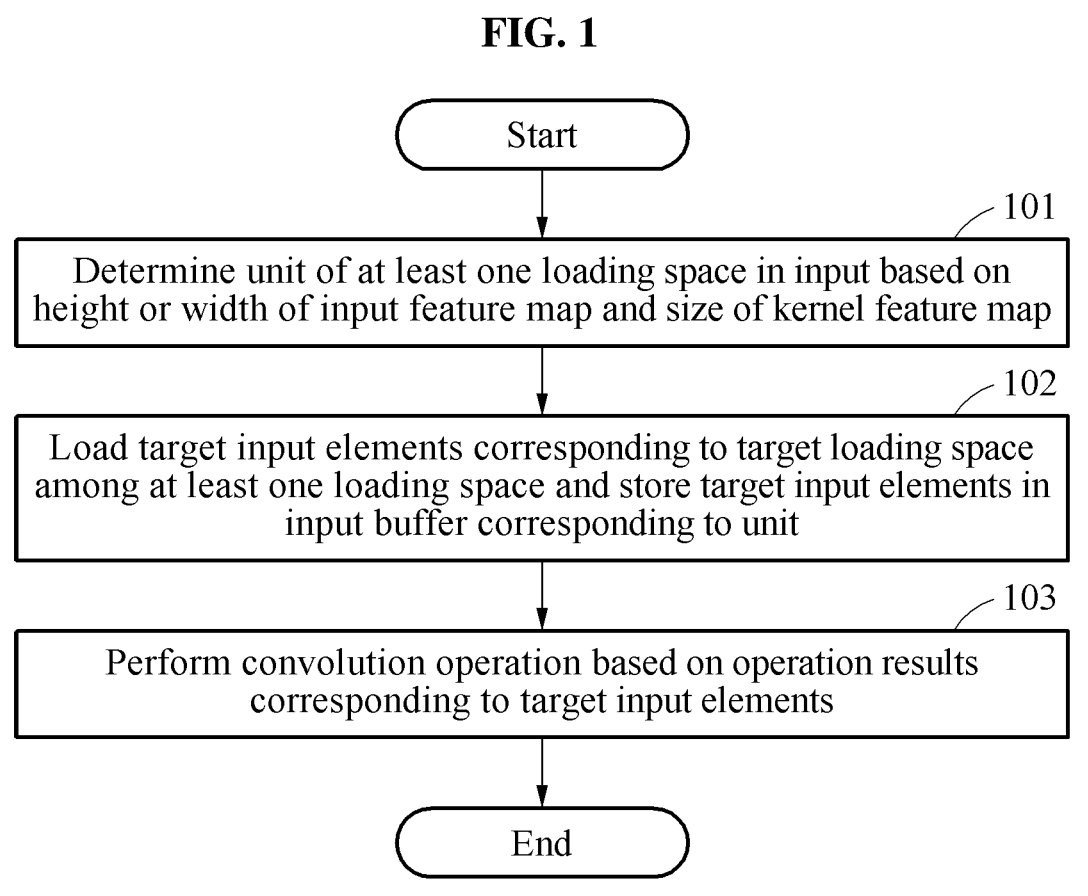

Start

101

Determine unit of at least one loading space in input based on height or width of input feature map and size of kernel feature map

102

Load target input elements corresponding to target loading space among at least one loading space and store target input elements in input buffer corresponding to unit

103

Perform convolution operation based on operation results corresponding to target input elements End

FIG. 4A
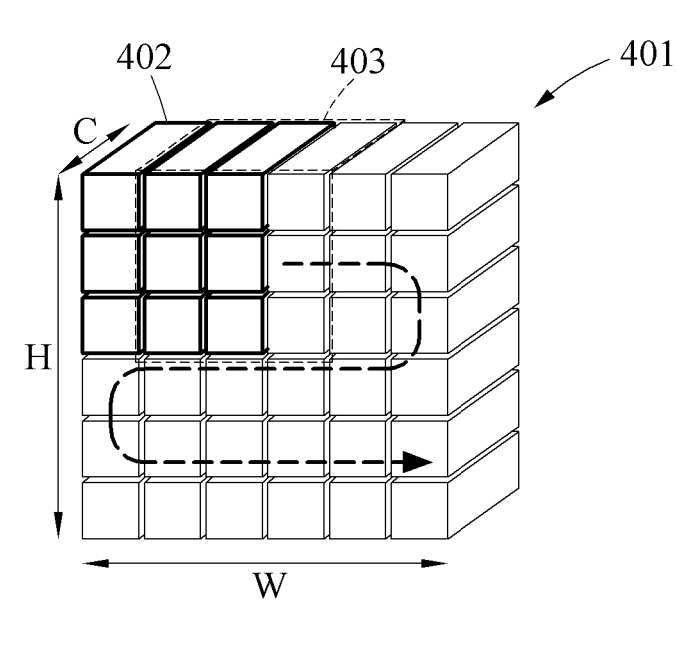
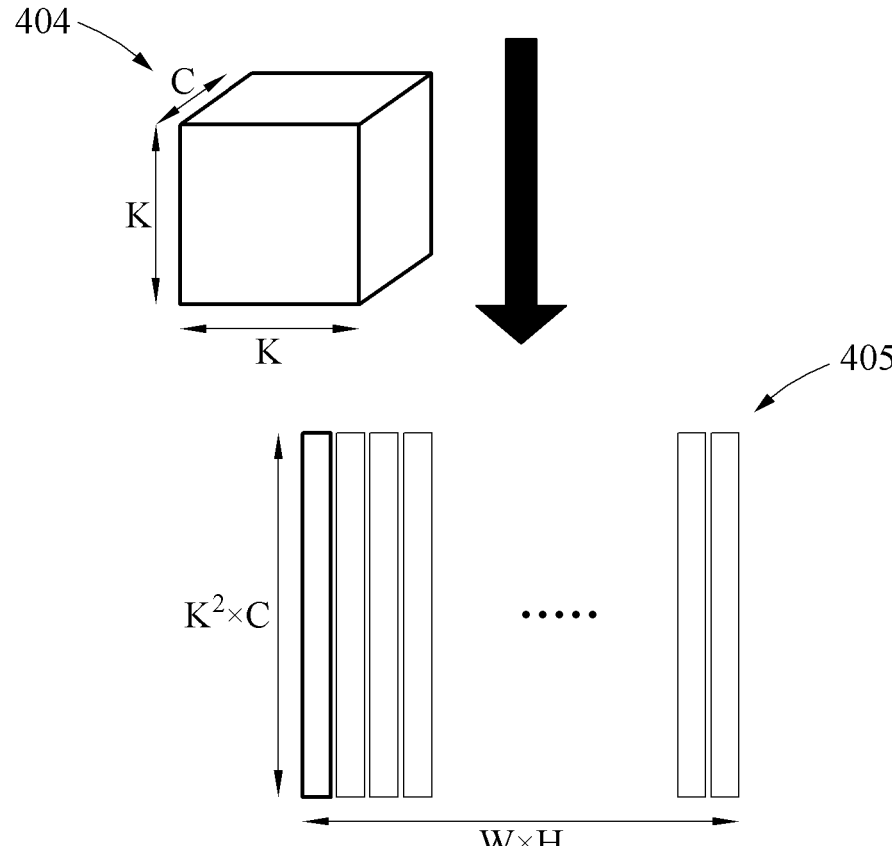

FIG. 5C

CONVOLUTIONAL NEURAL NETWORK (CNN) PROCESSING METHOD AND APPARATUS

CROSS-REFERENCE TO RELATED APPLICATION

This is a Divisional Application of U.S. application Ser. No. 15/836,988, filed on Dec. 11, 2017, which application claims the benefit under 35 USC § 119(a) of Korean Patent Application No. 10-2017-0039561 filed on Mar. 28, 2017, in the Korean Intellectual Property Office, the entire disclosures of which are incorporated herein by reference for all purposes.

BACKGROUND

1. Field

The following description relates to convolutional neural network (CNN) processing technology and a CNN processing method and apparatus.

2. Description of Related Art

Neural network based deep learning technology is utilized in different fields and implementations. For example, deep learning based biometric recognition/authentication may be implemented to recognize faces, irises, and/or voices by a terminals, for example, a smart phone or desktop computer, for example. A convolutional neural network (CNN) refers to a trained multilayer neural network structure in which one or more convolutional operations are implemented. CNNs may exhibit good performance in the field of deep learning based image and voice recognition. For example, deep learning-based image and/or voice recognition may be implemented through one or more trained CNNs. However, as such trained CNNs become more sophisticated and proficient, they require more and more resources of the underlying terminal, to an extent that some trained CNNs may not be operable or implementable, or not operable or implementable in real time, on lesser capable terminals, such as the example smartphone.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor-implemented convolutional neural network (CNN) processing method includes determining a loading space unit for at least one loading space in an input based on a height or a width for an input feature map of the input and an extent of a dimension of a kernel feature map, loading target input elements corresponding to a target loading space, among the at least one loading space, from a memory and storing the target input elements in an allocated input buffer having a size corresponding to the loading space unit, and performing a convolution operation between the target input elements stored in the input buffer and at least one kernel element of a kernel.

The method may further include performing the allocating of the input buffer to have a length equal to a size of the loading space unit.

The determining of the loading space unit may include determining an extent of a first dimension of the loading space unit to be a total number of channels of the input, of a corresponding kernel of the kernel feature map, or of the kernel or another kernel of a kernel set that includes the kernel, determining an extent of a second dimension of the loading space unit to be the extent of the dimension of the kernel feature map, and determining an extent of a third dimension of the loading space unit to be the height or the width of the input feature map, where the size of the loading space may be the determined extent of the first dimension*the determined extent of the second dimension*the determined extent of the third dimension.

First input elements corresponding to a first height and width position, of the input and of different input feature maps, may be interleaved by channel so as to be consecutively stored in the memory, followed by second input elements corresponding to a next height or width position, of the input and of the different input feature maps, being interleaved by channel so as to be next consecutively stored in the memory, and kernel elements may be prestored in another memory based on the loading space unit and in an order to perform the convolution operation between the target input elements and the kernel elements.

A direction in which respective interleaved input elements are consecutively stored may be a width direction, and the loading space unit may be determined to have dimensions corresponding to a width of the kernel feature map and the height of the input feature map.

The determining of the loading space unit may include determining a depth of the loading space unit based on a total number of channels of the input, determining a width of the loading space unit based on the width of the kernel feature map, and determining a height of the loading space unit based on the height of the input feature map.

The second input elements may correspond to the next width direction position of the input in a subsequent column of a same row of the input.

The respectively interleaved input elements may be consecutively stored according to a horizontal rasterizing scheme.

A direction in which respective interleaved input elements are consecutively stored may be a height direction, and the loading space unit may be determined to have dimensions corresponding to a height of the kernel feature map and the width of the input feature map.

The determining of the loading space unit may include determining a depth of the loading space unit based on a total number of channels of the input, determining a height of the loading space unit based on the height of the kernel feature map, and determining a width of the loading space unit based on the width of the input feature map.

The second input elements may correspond to the next height direction position of the input in a subsequent row in a same column of the input.

The respectively interleaved input elements may be consecutively stored according to a vertical rasterizing scheme.

The input, of a convolutional layer corresponding to the convolution operation, may include respective input feature maps corresponding to different input channels, a kernel set of the convolutional layer may include at least one kernel, including the kernel, corresponding to at least one output channel, and each of the at least one kernel may include respective kernel feature maps corresponding to the input channels.

The method may further include determining, after convolution operations corresponding to the target input elements are completed, a subsequent loading space of the target loading space based on a predetermined stride and the loading space unit, and loading subsequent input elements corresponding to the subsequent loading space and storing the subsequent input elements in the input buffer.

The performing of the convolution operation may include acquiring at least one operation result corresponding to the convolution operation to generate an output of a corresponding convolutional layer, and generating the output of the corresponding convolutional layer based on the at least one operation result and to have a size of a pad corresponding to an input of a subsequent convolutional layer of the convolutional layer.

A size of the output may be defined based on a size of the input of the subsequent convolutional layer, and padding may be applied to the input of the subsequent convolutional layer based on the size of the pad.

The output may include at least one output feature map corresponding to at least one output channel, and the generating of the output may include mapping the at least one operation result on an output feature map, of the at least one output feature map, to which padding is applied based on the size of the pad.

The performing of the convolution operation may include determining whether to skip at least one operation, of the convolution operation, between one or more kernel elements and at least one target input element of the target input elements based on kernel information indicating a skip target among plural kernel elements of a convolutional layer corresponding to the convolution operation.

The skip target may include an indication of at least one skip target kernel element pre-classified from the plural kernel elements of the convolutional layer, and the kernel information may include at least one of a start point of the at least one skip target kernel element and a total number of plural kernel elements, which include the at least one skip target kernel element and are consecutively stored in another memory, to skip.

The at least one skip target kernel element may include a predetermined kernel element of which a degree of contribution to an output corresponding to the convolutional layer is predetermined, or an output corresponding to a neural network that includes the convolutional layer, to satisfy a predefined condition.

The performing of the convolution operation may further include skipping respective operations, of the convolution operation, corresponding to the at least one skip target kernel element, and updating respective output elements of the convolutional layer, corresponding to the skipped respective operations, based on at least one bias.

The performing of the convolution operation may include determining whether to skip at least one operation, of the convolution operation, between a select kernel and at least one target input element of the target input elements based on kernel information indicating a skip target among plural kernels of a kernel set of a convolutional layer corresponding to the convolution operation.

The kernel set of the convolutional layer may include one or more respective kernels, including the kernel, corresponding to different output channels of an output, the skip target may include an indication of at least one skip target kernel pre-classified from among the one or more respective kernels stored in another memory, and the kernel information may include a start point of the skip target kernel in the other memory.

The performing of the convolution operation may further include skipping respective operations, of the convolution operation, corresponding to the at least one skip target kernel, and updating respective output elements of the convolutional layer, corresponding to the skipped respective operations, based on at least one bias.

The convolution operation may be of a convolutional layer of a convolutional neural network (CNN) having a trained objective defined by trained parameters, including the kernel, and the method may further include indicating a result of an implementation of the CNN, which includes the performed convolution operation.

In one general aspect, provided is a non-transitory computer-readable medium storing instructions, which when executed by a processor, cause the processor to implement one or more, any combination, or all processes described herein.

In one general aspect, a processor-implemented convolutional neural network (CNN) processing method includes acquiring at least one convolution operation result between at least one kernel element and at least one input element of an input of a convolutional layer, and generating an output of the convolutional layer based on the at least one operation result and a size of a pad corresponding to an input of a subsequent convolutional layer of the convolutional layer of a neural network that includes the convolutional layer and the subsequent convolutional layer.

The size of the output may be defined based on a size of the input of the subsequent convolutional layer, and padding may be applied to the input of the subsequent convolutional layer based on the size of the pad.

The output of the convolutional layer may include at least one output feature map corresponding to at least one output channel, and the generating of the output may include mapping the at least one operation result on an output feature map, of the at least one output feature map, to which padding is applied based on the size of the pad.

In one general aspect, a processor-implemented convolutional neural network (CNN) processing method includes acquiring kernel information indicating a skip target of a convolution operation, determining which convolution operations, between at least one input element of an input and respective kernel elements of kernel elements of a convolutional layer, to skip based on the kernel information, and implementing the convolutional layer by skipping respective convolution operations, of the convolutional layer, based on a result of the determining, and otherwise performing remaining convolution operations of the convolutional layer.

The skip target may include an indication of at least one skip target kernel element pre-classified from the kernel elements, and the kernel information may include at least one of a start point of the at least one skip target kernel element and a total number of plural kernel elements, which include the at least one skip target kernel element and are consecutively stored in a memory, to skip.

The at least one skip target kernel element may be a predetermined kernel element of which a degree of contribution to an output corresponding to the convolutional layer, or an output corresponding to a neural network that includes the convolutional layer, satisfies a predefined condition.

The implementing of the convolutional layer may include skipping the convolution operation corresponding to the skip target, and updating an output element of the convolutional layer, corresponding to the skipped convolution operation, based on at least one bias.

A kernel set of the convolutional layer may include at least one kernel, including plural kernel elements among the kernel elements, corresponding to at least one output channel of the convolutional layer, the skip target may include an indication of at least one skip target kernel pre-classified from the at least one kernel, and the kernel information may include a start point of the skip target kernel stored in a memory.

The determining of which convolution operations to skip may include determining which kernel convolution operations, between the at least one input element and respective corresponding plural kernel elements among each of the at least one kernel of the kernel set, to skip, and the implementing of the convolutional layer may further include skipping respective kernel convolution operations corresponding to the at least one skip target kernel, and updating respective output elements of the convolutional layer, corresponding to the skipped respective kernel convolution operations, based on at least one bias.

In one general aspect, a convolutional neural network (CNN) processing apparatus includes a processor configured to determine a loading space unit for at least one loading space in an input based on a height or a width for an input feature map of the input and an extent of a dimension of a kernel feature map, load target input elements corresponding to a target loading space, among the at least one loading space, from a memory and store the target input elements in an allocated input buffer having a size corresponding to the loading space unit, and perform a convolution operation between the target input elements stored in the input buffer and at least one kernel element of a kernel.

In one general aspect, a convolutional neural network (CNN) processing apparatus includes a processor configured to acquire at least one convolution operation result between at least one kernel element and at least one input element of an input of a convolutional layer, and generate an output of the convolutional layer based on the at least one operation result and a size of a pad corresponding to an input of a subsequent convolutional layer of the convolutional layer of a neural network that includes the convolutional layer and the subsequent convolutional layer.

In one general aspect, a convolutional neural network (CNN) processing apparatus includes a processor configured to acquire kernel information indicating a skip target of a convolution operation, determine which convolution operations, between at least one input element of an input and respective kernel elements of kernel elements of a convolutional layer, to skip based on the kernel information, and implement the convolutional layer by skipping respective convolution operations, of the convolutional layer, based on a result of the determining, and otherwise performing remaining convolution operations of the convolutional layer.

In one general aspect, a processor-implemented convolutional neural network (CNN) processing method includes determining a loading space unit for an input based on a height or a width for an input feature map of the input and an extent of a dimension of a kernel feature map, sliding the loading space unit across the input in units of a predetermined stride to load respective target loading spaces of the input from a memory into one or more respective input buffers, and performing respective convolution operations between each loaded respective target loading space stored in the one or more respectively allocated input buffers and kernel elements of a kernel of a convolutional layer.

The loading space unit may be a third order tensor.

The performing of the respective convolution operations may include selectively not performing all convolution operations of the convolutional layer based on one or more determined skip target kernel elements or one or more determined skip target kernels.

The method may further include performing the respective allocating of the one or more input buffers to each have a length equal to a size of the loading space unit.

The determining of the loading space unit may include determining an extent of a first dimension of the loading space unit to be a total number of channels of the input, of a corresponding kernel of the kernel feature map, or of the kernel or of another kernel of a kernel set corresponding to the convolutional layer, determining an extent of a second dimension of the loading space unit to be the extent of the dimension of the kernel feature map, and determining an extent of a third dimension of the loading space unit to be the height or the width of the input feature map, where the size of the loading space may be the determined extent of the first dimension*the determined extent of the second dimension*the determined extent of the third dimension.

The loading of the respective target loading spaces of the input from the memory may include sequentially loading input elements from the memory, where the memory may store first input elements corresponding to a first height and width position, of the input and of different input feature maps, interleaved by channel so as to be consecutively stored in the memory, followed by second input elements corresponding to a next height or width position, of the input and of the different input feature maps, interleaved by channel so as to be next consecutively stored in the memory.

The performing of the respective convolution operations may include sequentially loading the kernel elements from another memory, the kernel elements being stored in the other memory based on the loading space unit, where the other memory may store a first kernel element corresponding to a second height and width position, of the kernel and of different channels, interleaved by channel so as to be consecutively stored in the other memory, followed by a second kernel element corresponding to a next height or width position, of the kernel and of the different channels, interleaved by channel so as to be next consecutively stored in the other memory.

The respectively interleaved input elements may be consecutively stored in the memory according to a horizontal rasterizing scheme.

The respectively interleaved input elements may be consecutively stored in the memory according to a vertical rasterizing scheme.

Other features and aspects will be apparent from the following detailed description, the drawings, and the claims.

BRIEF DESCRIPTION OF THE DRAWINGS

FIG. 1 is a flowchart illustrating an example of a convolutional neural network (CNN) processing method in accordance with one or more embodiments.

FIGS. 4A and 4B are diagrams illustrating examples of a loading space and a loading space unit for the loading space in accordance with one or more embodiments.

FIG. 5C is a diagram illustrating an example of operations of input elements stored in an input buffer in accordance with one or more embodiments.

Figure 2:
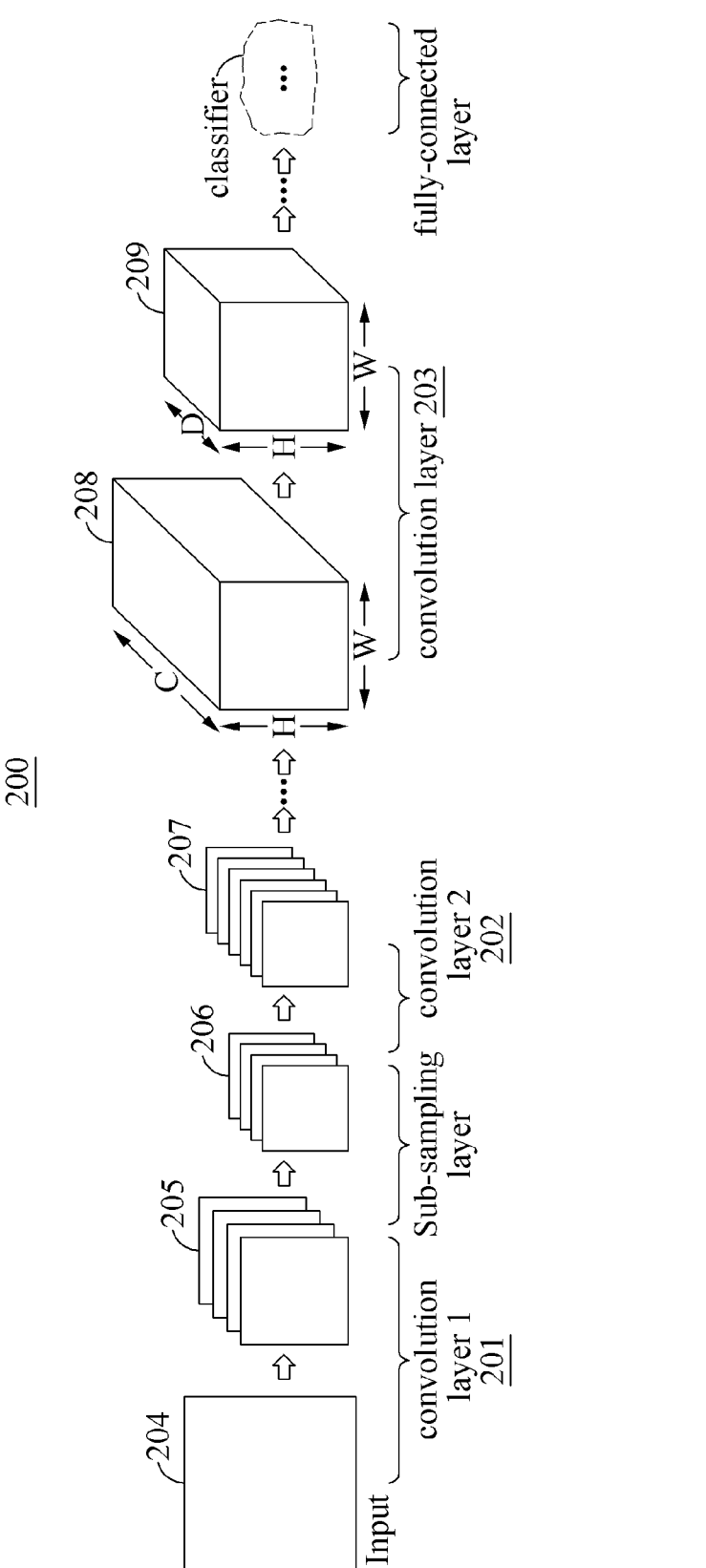
FIG. 2 is a diagram illustrating an example of a CNN in accordance with one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise. As further used herein, the terms "comprises," "comprising," "includes," "including," "has", and/or "having" when used herein, specify the presence of stated features, numbers, operations, elements, components, and/or combinations or groups thereof in one or more example embodiments, but do not preclude the presence or addition of one or more other features, numbers, operations, elements, components, and/or combinations or groups thereof in alternative embodiments, nor the lack of such stated features, numbers, operations, elements, components, and/or combinations or groups thereof in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more embodiments may implement one or more deep neural network acceleration schemes. For example, such acceleration schemes may provide high speed processing of a recognition or authentication operation in a limited embedded system, such as a smart phone example, without causing a decrease in performance. Recognition technology using one or more convolutional neural networks (CNNs) described herein, with various acceleration schemes, may be implemented in an example terminal environment of limited resources, and may also provide a robust performance in various environments. For example, in an example, a CNN processing apparatus according to one or more embodiments may implement an acceleration of a trained CNN to respond within a limited time in a trust zone of a smart phone. For example, such a trained CNN may not be able to respond within such a limited time without one or more acceleration schemes discussed herein. The CNN processing methods, for example, may be implemented using only limited computing resources, such as when embodiments include a corresponding CNN processing apparatus implementing a CNN using a single core of a processor. The CNN processing apparatus may perform selective convolutional operations for respective convolutional layers through select respective matrix multiplication operations between trained kernel(s) and input data, and in examples, such CNN processing techniques may provide high speed CNN processing by reducing an operation count.

FIG. 1 is a flowchart illustrating an example of a convolutional neural network (CNN) processing method in accordance with one or more embodiments.

Referring to FIG. 1, in operation 101, a CNN processing apparatus determines a loading space unit for at least one loading space in an input based on a height or a width of an input feature map and a size of a kernel feature map. The CNN processing apparatus is an apparatus configured to implement a processing of a CNN, and may be implemented as a hardware module, or a combination of a hardware module and instructions stored or embodied on non-transitory computer readable media, which when executed, cause or control one or more processors, e.g., of the hardware module, to implement one or more or any combination or all processes or methods described herein. For example, the CNN processing apparatus may generate or process operations and instructions associated with implementing the CNN, as well as perform further processes to implement further operations based on results of the implementation of the CNN. The CNN processing apparatus may be provided in, or representative of, various computing devices and/or systems such as a smart phone, a tablet computer, a laptop computer, a desktop computer, a television, a wearable device, a security system, and a smart home system. The CNN processing apparatus loads a kernel or an input, e.g., from a database, that is established in advance. The database may be implemented as a memory included in the CNN processing apparatus, or as an external device such as a server connected, or connectable, to the CNN processing apparatus in a wired or wireless manner or through a network.

In an example, the CNN processing apparatus may be a recognition, rejection, or verification apparatus, such as described below with respect to FIG. 15. In addition, as explained below, in machine learning herein, a CNN, as a type of neural network, may include one or a plurality of convolutional layers designed to perform respective convolutional operations. In addition, the CNN may have additional layers, such a fully connected layers, as well as input and output layers. The convolutional layers making up the CNN may each perform a convolution operation associated with an input to a convolutional layer using one or more kernels. When the CNN includes a plurality of convolutional layers, the CNN processing apparatus performs respective convolution operations corresponding to each of the convolutional layers, and thus, performs a plurality of convolution operations based on the CNN. A size of an output, at least one kernel, and an input of each of the convolutional layers may be predefined based on a configuration of the corresponding convolutional layer.

For example, in the present disclosure, apparatuses may be described as implementing CNNs, e.g., based on convolutions using previously trained parameters and/or convolutions or convolution operations that are selectively performed based on such previously trained parameters, though embodiments are not limited to such apparatuses only performing such convolutional and/or selective convolutional operations, but rather embodiments also include such apparatuses also being configured to train the CNN as described below, as well as or also use the trained CNN and/or selectively implemented CNN in an example recognition, rejection, verification, classification, or other such 'interpretative' operations or objectives the respective layers or overall CNN are trained to perform.

Referring to FIG. 1, the CNN processing apparatus may acquire trained parameters corresponding to one or more layers included in a neural network, e.g., the herein discussed example CNN type of neural network, noting that embodiments are not limited thereto. For example, the CNN processing apparatus may acquire parameters, e.g., as determined by the CNN processing apparatus during the training of the neural network by the CNN processing apparatus, from memory, or through external request or provision. Additionally, the CNN processing apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The CNN processing apparatus may also be provided or made available the kernel(s), kernel element(s), and/or other connection weight vectors, matrix or matrices, or other format kernels, kernel elements, and/or connection weights, as a result of training of the neural network by another processing apparatus or server, for example. The CNN processing apparatus is representative of one or more processors and one or more non-transitory memories, for example, such as to store such parameters, for use during and after the convolutional and/or selective convolutional operations of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer. Depending on the architecture of the neural network, nodes included in neighboring layers may be selectively connected according to respective connections, e.g., which may or may not be weighted. For example, the neural network may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed recognition, verification, or rejection, such as language/acoustic or image recognition or verification, translation or rejection, or input data binary or multi-class classification, clustering, pattern observation, transformation, and/or regression, as well as any other trained objective of the neural network. In varying embodiments, the neural network may be trained for acoustic and/or language recognition and/or translation, image recognition, identification, rejection, or discrimination, or battery characteristic monitoring or projection, as only non-limiting examples. Thus, based on the training data and desired interpretation objective, the architecture, selective connections between neighboring nodes and/or kernels, kernel elements, or other connections within layers may be varied during training until the neural network is trained to a desired acceptability for the desired interpretation objective. For example, in examples where the neural network is trained for image recognition, verification, or rejection, the neural network may include convolutional layers or be representative of a CNN, and thus the respective convolutional kernel elements, e.g., for varying feature extractions through feature kernels, may be trained to an original desired acceptability for the image recognition, verification, or rejection operations. The neural network may also be of a different type of neural network and merely include one or more convolutional layers, e.g., for selective feature extraction, for other objectives. Thus, herein, though embodiments may be discussed from the perspective of a CNN processing apparatus, such reference to CNNs is not intended to be limiting of the apparatus to only implementing CNNs or even to implement CNNs. Returning to the training of the neural network, the resultant kernels, kernel elements, and/or other connection weights of the trained neuro network may be referred to as parameters of the neural network, e.g., demonstrated as at least trained kernel elements of a convolutional layer or operation of the CNN. As only examples, the neural network may be trained based on the labeled input image information or desired corresponding output images or classifications, such as through a backpropagation or simulated annealing algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neuro network may be stored in a memory of the training and/or an example recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such as the respective arrangement of layers and which are fully connected, recurrent, convolutional, de-convolutional, or pooling or sub-sampling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

Accordingly, before or during operations of FIG. 1, the CNN processing apparatus may acquire such trained parameters. In the present disclosure, a frequency of parameters may refer to a number of parameters, e.g., a number of the parameters that exist for an acquired layer. In addition, as noted and only as non-limiting examples, the parameters of the acquired layer may correspond to respective connection weights between a previous input or hidden layer and a current hidden layer of nodes, kernels, kernel elements, and/or other connection weights between nodes within a layer, or respective connection weights between a current layer and subsequent hidden or output layer of nodes. Respective kernels may correspond to, or provide, different feature extractors or discriminators in a convolutional layer, for example. In some layers some kernel elements or connection weights may also be shared by multiple nodes, such as kernel elements being available to be respectively shared or reapplied during each feature extraction or discrimination in a convolutional layer. The parameters will have various values dependent on the training process, so the trained neural network has a unique and specialized configuration To perform the convolution operation corresponding to each of the convolutional layers, the CNN processing apparatus may thus load input elements included in the input from a memory. The CNN processing apparatus may load the input elements corresponding to at least a portion of a space in the input. Here, a space to be a target of loading in the input is referred to as, for example, a loading space. The CNN processing apparatus determines a loading space unit to set the loading spaces and sets a plurality of loading spaces in the input based on the determined loading space unit. The CNN processing apparatus loads the input elements in the input, based on the loading space unit, from the memory. For example, the input elements may be loaded, from a database or an external or main memory of the CNN processing apparatus, to a local memory of the CNN processing apparatus.

To determine the loading space unit, the CNN processing apparatus uses a size of the input feature map and a size of the kernel feature map. The loading space unit may be set based on a direction, e.g., a preset or determined direction, in which the input elements are consecutively stored. The CNN processing apparatus allocates an input buffer (also referred herein to as any of a temporary or local memory or buffer) to the loading space unit, stores input elements corresponding to a loading space to the allocated input buffer, and performs a convolution operation based on the stored input elements. An example of a CNN will be described with reference to FIG. 2. An example of a convolution operation will be described with reference to FIG. 3. Examples of a loading space and a loading space unit for the loading space will be described with reference to FIGS. 4A and 4B. Example of a direction in which input elements or kernel elements are consecutively stored will be described with reference to FIGS. 5A and 6A. Examples of allocating such an input buffer and storing input elements in the allocated input buffer will be described with reference to FIGS. 5B and 6B. Examples of operations corresponding to input elements stored in such an input buffer will be described with reference to FIGS. 5C and 6C.

FIG. 2 is a diagram illustrating an example of a CNN in accordance with one or more embodiments.

FIG. 2 is a diagram illustrating an example of a CNN or DCNN. Thus, as only an example, in one or more embodiments, the trained neural network, e.g., the neural network with trained kernels, kernel elements, and/or other connection weightings, may be a deep convolutional neural network (DCNN) with more than one hidden layer, and embodiments may further include the training of the DCNN based on a number of sample training images or other non-image training data with kernels, kernel elements, and/ or other connection weightings being adjusted through multiple iterations, such as through backpropagation training, until the DCNN accurately recognizes input images, as only an example, or performs other desired objectives. Still further, the DCNN may have a parallel architecture where convolutions are performed simultaneously in respective parallel layers, the results of which are ultimately combined in a subsequent same layer. Respective layers of the DCNN may be classified based on a function or operation of each layer, and the DCNN may include one or more convolutional layers configured to respectively generate, e.g., extractable or storable, features through respective convolutions performed on the input data, a pooling or sub-sampling layer configured to perform abstraction to map a plurality of pixels or values from a previous layer to a lesser number of pixels or values, one or more further convolutional layers that respectively generate features through respective convolutions, further pooling or sub-sampling layers, etc., and an example one or more fully-connected layers configured to classify, for example, features transferred from one or more previous layers. The fully-connected or dense layer may include one or multiple fully-connected or dense layers. There may be multiple convolution layers which respectively perform convolutional filtering, for example, on connected results from a previous layer, e.g., with the convolutional layers each outputting three-dimensional boxes or third-order tensors of plural feature images whose dimensions may depend on the kernel/filter size of the corresponding convolutional layer. In addition, there may be weighted connections to each convolutional layer in correspondence to each pixel of the corresponding convolutional layer and for each filter of the corresponding convolutional layer. Through convolution of multiple filters across the pixels in each convolution layer, due to the respective configurations of each convolution layer, distinguishing features of input (from the previous layer or input layer) example image may be recognized. The DCNN may further include multiple pooling or sub-sampling layers that may each respectively downsample input pixels or three-dimensional boxes or third-order tensors from a previous layer, as only examples, such as without weighting, for example. For example, a pooling or sub-sampling layer may downsample a particular or each respective slice or channel of an input, e.g., the three-dimensional box or third-order tensor, to the pooling or sub-sampling layer or may operate to down-sample the input to another example three-dimensional box or third-order tensor that may have at least some different dimensional extents. Thus, the DCNN may have a complex architecture, where many parameters of the DCNN that can and may be varied during the training process until trained parameters and hyper-parameters of the DCNN with an acceptable error rate are found. Herein, when referring to a CNN, it is intended that this reference is with respect to CNNs and DCNNs, or any neural network with at least one convolutional layer or convolutional trained objective.

Referring to FIG. 2, a CNN 200 includes a plurality of convolutional layers, for example, a convolutional layer 1 201, a convolutional layer 2 202, and a convolutional layer 203. A CNN processing apparatus performs convolution operations between respective inputs and kernels of each of the convolutional layers to generate an output. The CNN processing apparatus determines a loading space unit for at least one loading space in an input for each of the convolutional layers. Thus, a loading space unit applied to each of the convolutional layers may vary, such as based on a trained design or objective of the corresponding convolutional layer, in varied embodiments.

An input of a convolutional layer is data used as an input of the corresponding convolutional layer, e.g., data that is input to the CNN with one or more channels of information or data that is output by a previous layer of the CNN as one or more feature maps or channels, and thus may include one or more feature maps corresponding to an output generated by a previous layer or one or more channels of initial input data. As only an example, in some examples, the input to the CNN may be image data that has a channel for each of red, green, and blue captured image colors, and/or potentially a channel for any captured infrared data. The input data channels may be of the same dimensions, or made to have the same dimensions. For example, input data captured from an image sensor example may be normalized into a form suitable for input to a first layer of the CNN. In the example of FIG. 2, an input of the convolutional layer 1 201 is an initial input 204 of the CNN 200, and an input of the convolutional layer 2 202 is an output 206 of a pooling or sub-sampling layer subsequent to the convolutional layer 1 201. For example, the input 206 of the convolutional layer 2 202 may be generated by the sub-sampling layer 206, which performs such a sub-sampling or pooling operation on an output 205 of the convolutional layer 1 201.

An input 208 of the convolutional layer 203 includes input respective feature maps corresponding to C input channels, each having a size of W*H. Here, a width, a height, and a depth of the input 208 are W, H, and C, respectively. Also, a size of the input 208 is represented as W*H*C, such as representative of W*H*C input elements, for example. In this example, a width and a height of the input feature map are respectively W and H, and a number of input channels is C. The CNN processing apparatus performs a convolution operation corresponding to the input 208 using at least one kernel corresponding to the convolutional layer 203.

A kernel of a convolutional layer is predetermined data employed for a convolution operation corresponding to the convolutional layer and, for example, is predefined or trained based on training input and output of the corresponding convolutional layer. One or more of such kernels, each having respective trained designs or objectives, are respectively implemented in each of the convolutional layers included in the CNN 200. In this example, the one or more kernels of each of the convolutional layers are each collectively referred to as respective kernel sets. Each kernel set includes a number of kernels corresponding to the number of output channels of a particular convolutional layer. For example, to acquire a desired output, or perform a trained objective, of a convolutional layer, a kernel set of the corresponding convolutional layer is predefined such that particular convolution operations are performed with respect to an input of the corresponding convolutional layer. The output of the convolutional layer is data obtained by performing the respective convolution operations between each of the kernels of the kernel set and the input to the corresponding convolutional layer. The output of the convolutional layer includes at least one output feature map and may be used as, or used to further derive, an input of a subsequent layer.

Thus, the CNN processing apparatus generates an output 209 by performing respective convolution operations between the input 208 and each of the kernels of the kernel set corresponding to the convolutional layer 203. The output 209 of the convolutional layer 203 includes output feature maps corresponding to D output channels, each having a size of W*H. Here, a width, a height, and a depth of the output 209 are W, H, and D, respectively. Also, a size of the output 209 is represented as W*H*D, such as representative of W*H*C output elements, for example. In this example, a width and a height of the output feature map are respectively W and H, and a number of output channels is D. The CNN processing apparatus generates output feature maps corresponding to the D output channels based on respective operation results between the input 208 and kernels corresponding to the D output channels.

The CNN 200 includes the plurality of convolutional layers. Attributes, for example, the number of respective channels, the sizes of the respective feature maps, and the numbers of respective kernels, of the inputs 204, 206, and 208, the kernel sets, and the outputs 205, 207, and 209 of each of the convolutional layer 1 201, the convolutional layer 2 202, and the convolutional layer 203 may differ from one another depending on, as only an example, trained objective of each of the convolutional layer and of the CNN in general. The CNN processing apparatus adaptively respectively generate respective input buffers based on the attributes of each of the convolutional layer 1 201, the convolutional layer 2 202, and the convolutional layer 203 to perform the respective convolution operations corresponding to the convolutional layer 1 201, the convolutional layer 2 202, and the convolutional layer 203. Through this, the CNN processing apparatus may reduce the number of times that data used for each convolution operation is loaded, e.g., from a main memory to the respective input buffers or other temporary or local memories or buffers, thereby providing a high-speed CNN processing. Hereinafter, an example of performing such a convolution operation is described with reference to FIG. 3 based on the input 208 and the output 209 of the convolutional layer 203 in the example of FIG. 2.

Figure 3:
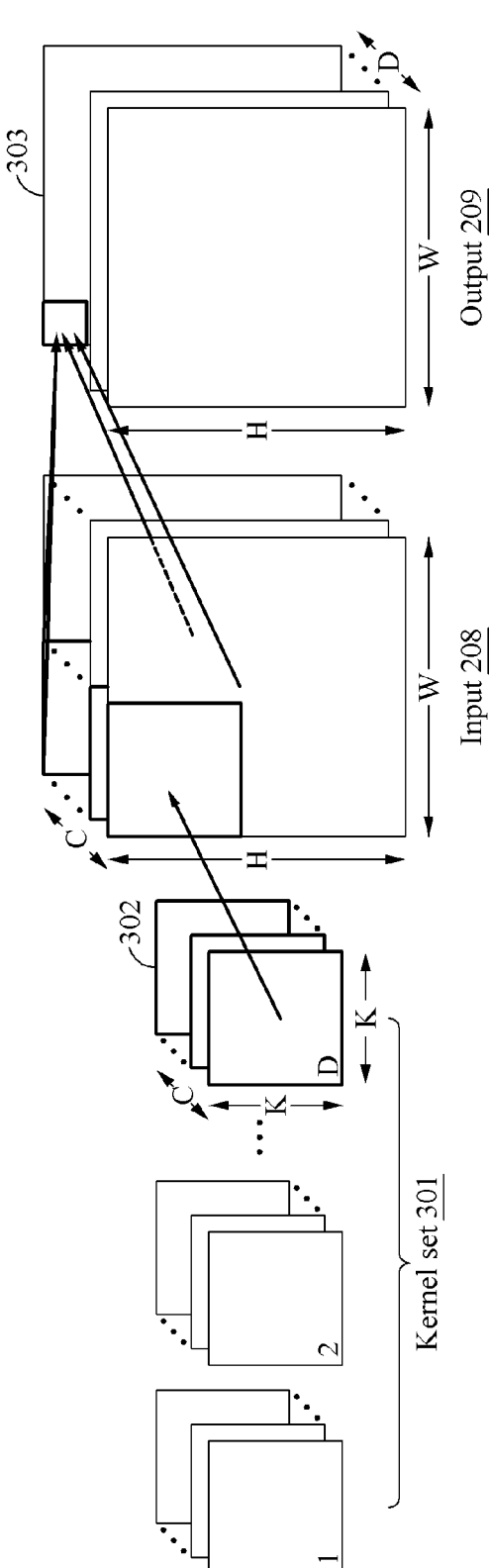
FIG. 3 is a diagram illustrating an example of a convolution operation in accordance with one or more embodiments.

FIG. 3 is a diagram illustrating an example of a convolution operation in accordance with one or more embodiments.

Referring to FIG. 3, a CNN processing apparatus performs a convolution operation between a kernel set 301 and the input 208 to generate the output 209. The input 208 includes input feature maps corresponding to C input channels, each having a size of W*H. Thus, the input 208 includes W*H*C input elements.

The input 208 may be a set of input feature maps to which padding has been applied, e.g., either upon or after output by the convolution layer 2 202 or upon or after input to convolutional layer 203. The padding may be a scheme of filling a portion of region(s) (for example, in general, one or more or all edges, but may differ according to trained objective in varied embodiments) of an input with a predetermined value, for example. For example, padding applied to an input based on a pad in a size of 1 herein corresponds to an operation of filling at least one edge of an input feature map with a predetermined value, for example, 0. Also, zero-padding herein corresponds to an operation of setting the predetermined value to 0 for the at least one edge. When zero-padding having a pad in a size of 1 is applied to an input in a size of X*Y*Z, with the padding being applied to all width and height edges of the input, the padding-applied input may thereafter include (X+1)*(Y+1)*Z input elements as data in a size of (X+1)*(Y+1)*Z, with all four outer width and height edges of the padding-applied input having zero values. The referenced size of the padding herein refers to the number of padded predetermined values that are added, e.g., whether there is a single (size 1) outer layer of predetermined values added to such an edge or whether there two (size 2) or more outer layers of predetermined values added to such an edge.

The kernel set 301 includes D kernels respectively corresponding to the D output channels, each including C kernel feature maps corresponding to C input channels. Also, a size of each of the kernel feature maps is K*K, as only an example, and thus, the kernel set 301 includes K*K*C*D kernel elements. A kernel, such as kernel 302, included in the kernel set 301 includes K*K*C kernel elements and has a size of K*K*C. A size of the kernel set 301 is thus K*K*C*D.

The CNN processing apparatus performs an operation between the input 208 and a kernel corresponding to a first output channel of the kernel set 301 to generate an output feature map corresponding to the first output channel. Likewise, the CNN processing apparatus performs operations between each of the D kernels of the kernel set 301 and the input 208 to generate each of the respective output feature maps corresponding to D output channels. In the generation of an output feature map, multiplication operations may be performed with respect to each channel of a kernel of the kernel set 301, the results of which may be respectively accumulated to form each output element of the output feature map in accordance with the convolution operation between that kernel and the input 208. This multiplication and accumulation operation is referred to herein as a multiplication-accumulation (MAC) operation, as an example. Through the plural operations between each of the D kernels and the input 208, the CNN processing apparatus generates the output 209 including the generated plural output feature maps.

For example, the CNN processing apparatus generates an output feature map 303 having a size of W*H by performing an operation between the input 208 having a size of W*H*C and each channel of the kernel 302 in a size of K*K*C, the operation between the input 208 and the kernel 302 generating example output elements of the $D^{th}$ output channel. The illustrated output feature map 303 corresponds to the generated $D^{th}$ output channel. As discussed above, for example, the kernel 302 includes C kernel feature maps, each having a size of K*K. The CNN processing apparatus generates the output feature map 303 as a result of convolution operations between the input 208 and each of the C kernel feature maps of the kernel 302 by respectively sliding each kernel feature map having a size of K*K over each input feature map having a size of W*H included in the input 208 based on a predetermined stride, hereinafter referred to a stride. The stride refers to a sliding interval of a kernel stride map when performing the corresponding convolution operation. A sliding scheme, for example, a sliding direction, a sliding order, and a size of the stride may be applied in various ways depending on predesigned objectives of the convolutional layer and through varied embodiments.

The CNN processing apparatus thus performs multiplication-accumulation (MAC) operations between the input feature maps and the kernel feature maps to generate the output feature map 303. The MAC operation may be followed by respective applications of predetermined biases, corresponding to the kernel elements, to each of the respective accumulation results, thereby generating the output feature map 303. To perform the aforementioned convolution operation, the CNN processing apparatus loads at least one input element included in the input 208 from the memory, e.g., from a main memory of a local temporary output buffer of an output of a previous layer, and allocate an input buffer for storing the loaded input element. As only an example, upon generation of a previous output feature map by a previous layer, that result may have been stored to the memory. The CNN processing apparatus performs an operation between the kernel set 301 and the at least one input element stored in the input buffer.

The CNN processing apparatus allocates the input buffer based on a consecutiveness, for example, a data consecutiveness of the kernel elements or of the input elements stored in the memory and a reusability, for example, a data reusability of the input elements stored in the input buffer. As such, the CNN processing apparatus uses the input buffer allocated based on the data consecutiveness and the data reusability. Data reusability may correspond to the availability of reusing the loaded input elements stored in the input buffer for multiple convolution operations, e.g., with different kernel elements, kernel maps, or kernels. Through this, the CNN processing apparatus may reduce input elements overlapping in terms of the number of times that the same data is loaded during the multiple convolution operations of the convolutional layer, thereby improving a performance associated with a speed of processing the convolution operations. Hereinafter, such examples of allocating and applying an input buffer are described with reference to FIGS. 4A through 6C.

Figure 4B:
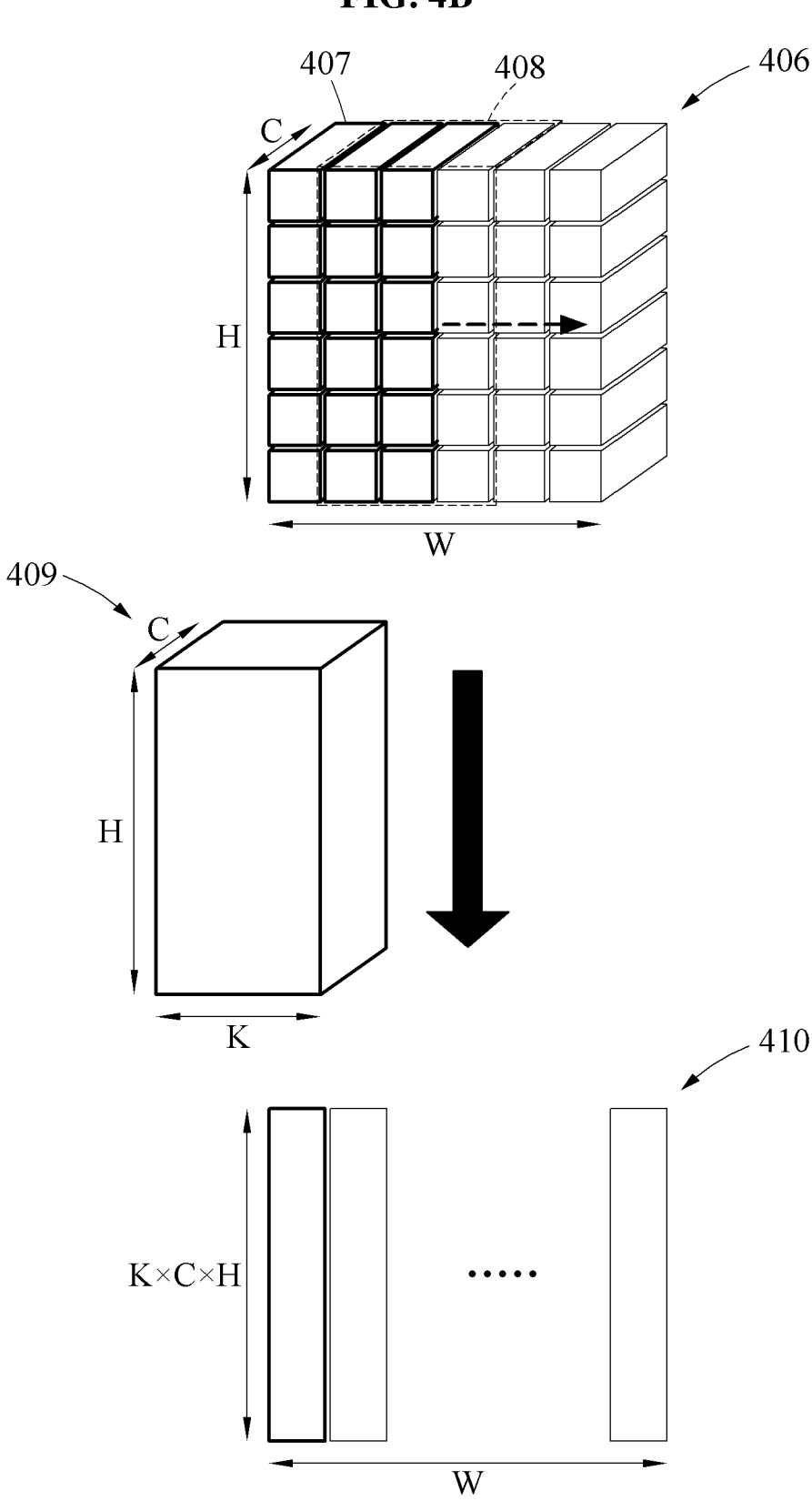

FIGS. 4A and 4B are diagrams illustrating examples of a loading space and a loading space unit for the loading space in accordance with one or more embodiments.

As described with reference to operation 101 of FIG. 1, a CNN processing apparatus determines a loading space unit for at least one loading space in an input. The determined at least one loading space unit may include less than all input elements of the input. The CNN processing apparatus determines at least one loading space in the input based on a size of the stride and the determined loading space unit. As described above, the CNN processing apparatus may load select input elements corresponding to a portion of a space in the input, e.g., corresponding to only such a portion of the space in the input. The loading space may indicate a space corresponding to a target of a selective partial loading of the input, including respective selective partial loadings of input elements for each channel of the input.

Referring to FIG. 4A, the CNN processing apparatus sets loading spaces, for example, loading spaces 402 and 403 in an input 401 based on a size of a kernel and a stride corresponding to a corresponding convolution of a predetermined convolutional layer. Here, the loading spaces 402 and 403 are respectively set based on a loading space unit 404. The CNN processing apparatus respectively loads input elements included in the loading spaces 402 and 403 from a memory, e.g., another or main memory which may store all input elements of the input, for example, based on the loading space unit 404. A width, a height, and a depth of the loading space unit 404 may be determined to be K, K, and C, respectively, which may match the K\*K\*C size of the example kernel, as only an example. Accordingly, the size of the loading space unit 404 may be $K^2*C$. Thus, for the respective loadings of input elements for the convolution operation and for reflecting a sliding of the kernel over the input 401, the CNN processing apparatus may slide the loading space unit 404 across the input 401 according to the stride to respectively loads $K^2*C$ input elements for each of the loading spaces 402 and 403 from the memory. For example, each of loading spaces 402 and 403 may represent a collection of $K^2*C$ input elements, corresponding to the determined loading space unit 404, with loading space 403 being a collection of $K^2*C$ input elements slid one example input element in the width direction from the collection of $K^2*C$ input elements represented by loading space 402.

In FIG. 4A, a sliding direction is indicated by the illustrated dashed arrow. For example, the sliding for each next loading space is performed in a width direction. In this example, after the sliding is performed up to a last column, the sliding of the next loading space is performed in the width direction based on a subsequent row, e.g., in a horizontal rasterizing manner. The CNN processing apparatus determines a length of an input buffer based on the size of the loading space unit 404 and allocates the input buffer corresponding to the determined length. For example, the CNN processing apparatus determines a length of the input buffer corresponding to the loading space unit 404 to be $K^2*C$, allocates the input buffer corresponding to the determined length, and stores the respective input elements of the loading spaces 402 and 403 in respective columns of the allocated input buffer or in respective allocated input buffers allocated for each loading space. Referring to FIG. 4A, when a size of the loading space unit 404 is $K^2*C$ and a size of a stride is 1, the CNN processing apparatus loads input elements 405 W\*H times in order to be stored in the example columns of the input buffer each having the length of $K^2*C$ or W\*H times in order to be stored in respectively allocated input buffers each having the length of $K^2*C$.

Referring to FIG. 4B, the CNN processing apparatus sets loading spaces, for example, loading spaces 407 and 408 in an input 406 based on a corresponding kernel and stride corresponding to a convolution operation of a predetermined convolutional layer. Here, the loading spaces 407 and 408 are set based on a loading space unit 409. The CNN processing apparatus respectively loads input elements included in the loading spaces 407 and 408 from the example memory based on the loading space unit 409. A width, a height, and a depth of the loading space unit 409 may be set or determined to be K, H, and C, respectively, such as based on a preset or in-process determinations of K (and C in an example), e.g., from one or more kernel maps or kernels of an example kernel set, and H (and C in an example,) from the input 401. Information of such K, H, and C dimensions may also be stored in the memory and/or obtained upon analyses of the kernel map, kernel, or kernel set and input. A size of the loading space unit 409 is thus K\*H\*C. Thus, to implement the convolutional operation, the CNN processing apparatus slides the loading space unit 409 in the input 406 to respectively load K\*H\*C input elements for each of the loading spaces 407 and 408 from the memory.

In FIG. 4B, a sliding direction is indicated by the illustrated dashed arrow. Since the size of the loading space unit 409 is K\*H\*C, the sliding may be performed in a width direction. Dissimilarly to FIG. 4A, when the sliding is performed up to a last column, a sliding operation may be terminated upon reaching the last input column, i.e., without the aforementioned horizontal rasterizing. The CNN processing apparatus determines a length of an input buffer based on the size of the loading space unit 409 and allocates the input buffer corresponding to the determined length. For example, the CNN processing apparatus determines a length of the input buffer corresponding to the loading space unit 409 to be K*H*C, allocates the input buffer corresponding to the determined length, and respectively stores the input elements of the loading spaces 407 and 408, as well as the remaining loading spaces, in the allocated input buffer or in respectively allocated input buffers having respective K*H*C lengths. Referring to FIG. 4B, when a size of the loading space unit 409 is K*H*C and a size of a stride is 1, the CNN processing apparatus loads input elements 410 W times in order to be stored in respective columns of the input buffer having the length of K*H*C or loads input elements 410 W times in order to be stored in the respectively allocated input buffers each having the length of K*H*C.

In comparison between FIG. 4A and FIG. 4B, the loading space unit 409 is greater in size than the loading space unit 404. By using the larger loading space unit 409, the CNN processing apparatus may reduce overlapping data loads in terms of the number of times that data is loaded when compared to a case in which the loading space unit 404 is used. When a size of a loading space unit is unlimitedly increased without considering a consecutiveness of data stored in a memory, the performance in terms of the number of times that data is loaded may be degraded irrespective of an increase in a length of an input buffer. Accordingly, in one or more examples, the CNN processing apparatus determines a loading space unit corresponding to a size of an input feature map and a size of a kernel feature map based on a direction, e.g., preset or determined direction, in which input elements are consecutively stored, and allocates one or more corresponding input buffers.

Figure 5A:
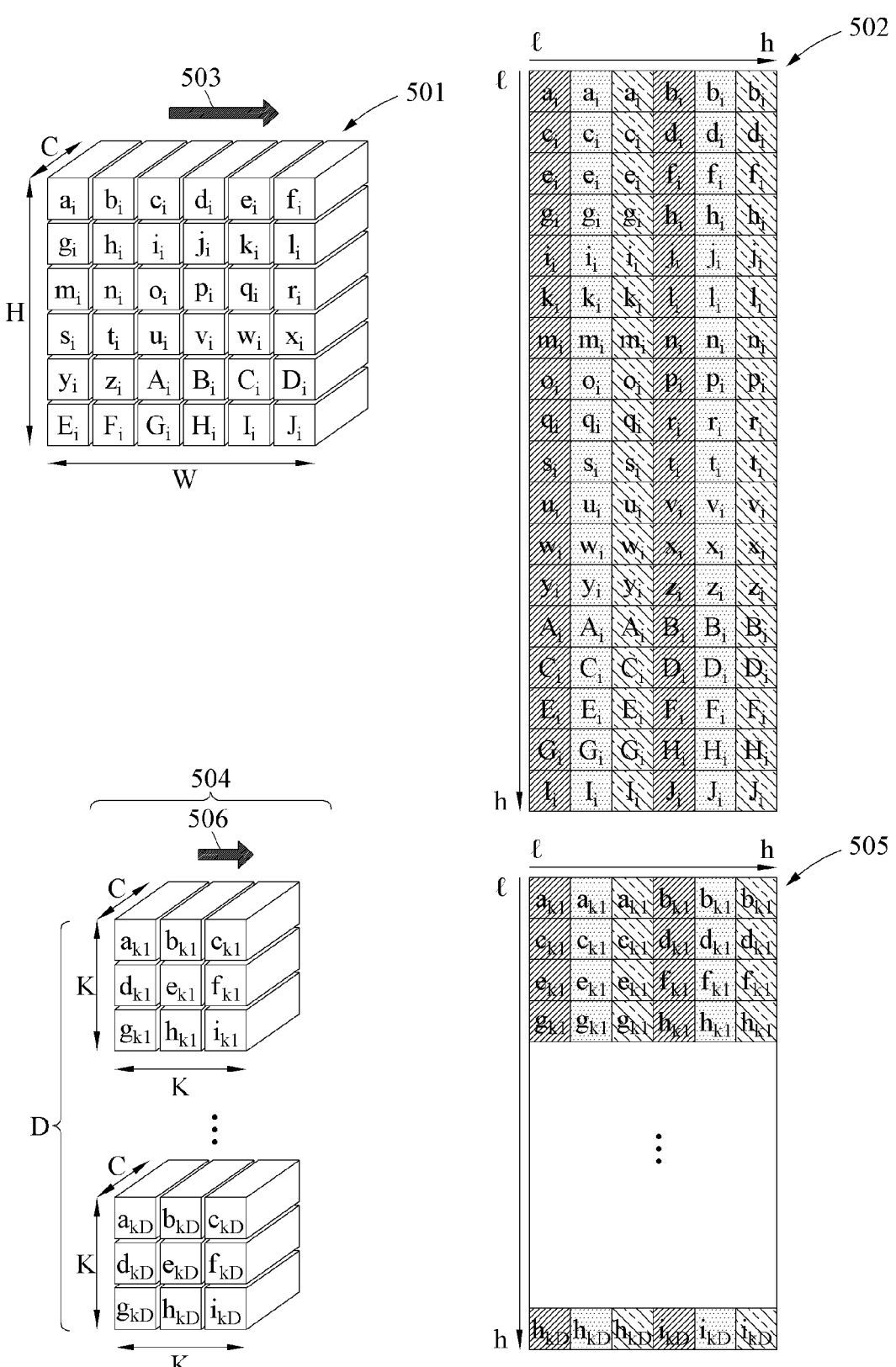
FIG. 5A is a diagram illustrating an example of directional storing of input elements and/or kernel elements in accordance with one or more embodiments.

FIG. 5A is a diagram illustrating an example of directional storing of input elements and/or kernel elements in accordance with one or more embodiments.

Referring to FIG. 5A, input elements included in an input 501 are interleaved when stored so as to be consecutively stored in a memory 502. For example, input elements corresponding to the same position in different input feature maps of the input 501, demonstrated through different hatching or shading, are interleaved so as to be consecutively stored in the memory 502. When the number of input channels in the input 501 is 3, for example, C=3, an input element $a_i$ corresponding to a first input channel, an input element $a_i$ corresponding to a second input channel, and an input element $a_i$ corresponding to a third input channel are interleaved so as to be consecutively stored in the memory 502.

Input elements included in the input 501 are consecutively stored in the memory 502 in a width direction 503. A case in which the input elements are consecutively stored in the memory 502 in the width direction 503 includes a case in which input elements corresponding to the same position in different input feature maps of the input 501 are consecutively stored, and input elements corresponding to a row of the same position and a subsequent column of a row of the same position are stored in the memory 502 subsequently to the input elements corresponding to the same position. When the number of input channels of the input 501 is 3, for example, C=3, input elements $a_i$ are interleaved to be consecutively stored in the memory 502, input elements $b_i$ are interleaved to be consecutively stored in the memory 502, and an remaining input elements are stored likewise in the memory 502. In this example, it may also be expressed that the input elements included in the input 501 are interleaved in the width direction 503 to be stored in the memory 502. Although FIG. 5A illustrates the memory 502 two-dimensionally in a form of map, the memory 502 stores data in an order from lower indices (I) to higher (h) input width indices in the same row or ordered subsequent rows, and stores data in an order in which data subsequent to data that is stored in a last column of a predetermined row is to be stored in a first column of a subsequent row of the predetermined row. As the next input row of the input 501 is stored, the memory 502 accordingly also stores data in the order from lower indices (I) to higher (h) input height indices in the same or subsequent rows. In this demonstrative example, an upper left most input element of input 501 may have a lowest width index and lowest height index. For example, the memory 502 stores input elements in an order "$a_i$, $a_i$, $a_i$, $b_i$, $b_i$, $b_i$, $c_i$, $c_i$, $c_i$, . . . , $J_i$, $J_i$, $J_i$". As another example, with example respective ordered indices for increments from 1 to each of H, W, and C of respective input elements I of the input 501, i.e., corresponding to $I_{(1\ through\ H)(1\ through\ W)(1\ through\ C)}$, the illustrated upper left input element of the first channel being and the illustrated bottom right input element of the first channel being $I_{HW1}$, through the upper left input element of the $C^{th}$ channel being $I_{11C}$ and the bottom right input element of the $C^{th}$ channel being $I_{HWC}$, the memory 502 may store input elements I in an order of "$I_{111}$, $I_{112}$, . . . $I_{11C}$, $I_{121}$, $I_{122}$, . . . $I_{12C}$, . . . $I_{211}$, $I_{212}$, . . . $I_{21C}$, $I_{221}$, $I_{222}$, . . . $I_{22C}$, . . . $I_{H11}$, $I_{H12}$, $I_{H1C}$ . . . $I_{HW1}$, $I_{HW2}$ . . . $I_{HWC}$". In this example, data is distinguished for each input channel corresponding to the same height and width indexed position.

Referring to FIG. 5A, kernel elements included in a kernel set 504 are stored in a memory 505 to correspond to input elements included in the input 501 for the subsequent corresponding convolution operation. Similarly or identically to the input elements stored in the memory 502, kernel elements included in the kernel set 504 are interleaved to be consecutively stored in the memory 505 based on their index positions and in order of their increasing indices. The kernel elements may be previously stored in the memory 505 based on a predetermined, for example, loading space unit corresponding to a predetermined convolutional layer, such as during a training operation of the convolutional layer or during a reorganization of stored parameters of the convolutional layer into the memory 505. A scheme of storing kernel elements may be previously determined, set for different objectives, for example, for each convolutional layer, and may then be stored in the memory 505 or later reorganized into the memory 505 in consideration of the predetermined scheme that will be implemented when storing input elements. For example, the convolutional apparatus may capture an image input, and normalize the image input to the memory 502 or may store or provide outputs of respective layers in the memory 505 for subsequent layer use.

As noted, kernel elements corresponding to the same height and width indexed position in different kernel feature maps of the kernel set 504 are interleaved to be consecutively stored in the memory 505. When the number of kernel feature maps of a first kernel included in the kernel set 504, for example, the number of input channels is 3, for example, C=3, a kernel element $a_{k1}$ corresponding to a first input channel, a kernel element $a_{k1}$ corresponding to a second input channel, and a kernel element aki corresponding to a third input channel are interleaved to be consecutively stored in the memory 505. Similar to memory 502, such different channels are demonstrated in FIG. 5A through different hatching or shading.

The kernel elements included in the kernel set 504 are consecutively stored in the memory 505 in a width direction 506 identically to the width direction 503 in which the input elements are stored in the memory 502. Again, in this example, the kernel elements may be previously stored in the memory 505 based on the scheme of storing the input elements. The CNN processing apparatus loads kernel elements prestored for each convolutional layer, as trained parameters of the convolutional layer, from the memory 505 so as to use the kernel elements for the convolution operation. The memory 505 may be repeatedly accessed for different inputs and corresponding convolution operations.

A scheme of consecutively storing the kernel elements in the width direction 506 may be based on a principle that the input elements are stored in the memory 502 in the width direction 503 of increasing width indices and then in increasing height indices. The kernel elements included in the kernel set 504 are stored in the memory 505 based on the principle, and kernels corresponding to output channels are stored in the memory 505 in an order of the output channels.

Figure 5B:
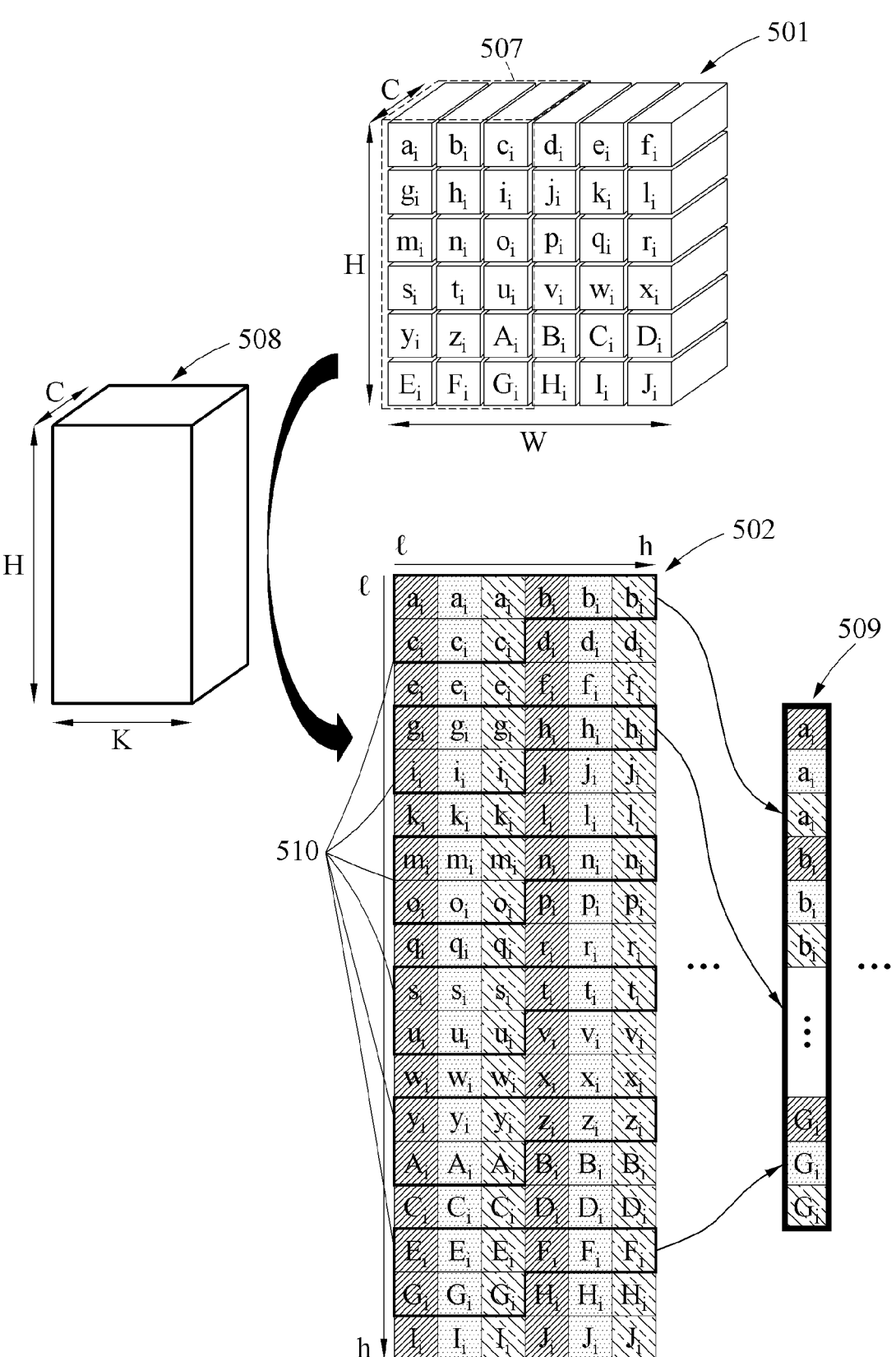
FIG. 5B is a diagram illustrating an example of an operation of generating an input buffer and storing input elements in the generated input buffer in accordance with one or more embodiments.

FIG. 5B is a diagram illustrating an example of an operation of allocating an input buffer and storing input elements in the allocated input buffer in accordance with one or more embodiments.

Referring to FIG. 5B, input elements in the input 501 are interleaved by channel to be consecutively stored in the memory 502 in a width direction, with the CNN processing apparatus determining a loading space unit 508 based on a height (H) of the input feature map 501. Kernel elements in a kernel set utilized by the CNN processing apparatus in a corresponding convolution operation of a convolution layer of the CNN processing apparatus may be prestored in a memory to correspond to input element in the input 501. For example, as described above with respect to FIG. 5A, the kernel elements in the kernel set may also be interleaved by channel and in a width direction so as to be consecutively stored in a memory in advance.

The CNN processing apparatus determines a depth of an example loading space unit 508 based on the number of input channels of the input 501, determines a width of the loading space unit 508 based on a width of a kernel feature map, for example, of a kernel of a kernel set the CNN processing apparatus utilizes to perform a convolution operation of a convolutional layer of the CNN processing apparatus, and determines a height of the loading space unit 508 based on a height of an input feature map of the input 501. Referring to FIG. 5B, when the number of input channels is C, the width of the kernel feature map is K, and the height of the input feature map is H, the CNN processing apparatus determines the depth, the width, and the height of the loading space unit 508 to be C, K, and H, respectively. In this example, a size of the loading space unit 508 is K*H*C.

To reduce a data redundancy of overlapping loading spaces, i.e., compared to an example where each of overlapping loading spaces respectively determined in direct increments of the stride are respectively loaded and/or used for the convolution operation, the CNN processing apparatus may determine the loading space unit 508 to have a height that is the same as the height of the input feature map. Thus, in an example, the CNN processing apparatus generates the loading space unit 508 having the same height as the height of the input feature map. In this example, the CNN processing apparatus may also set the width of the loading space unit 508 to be the same as the width of the kernel feature map, e.g., in consideration of a consecutiveness of the kernel elements stored in the memory. Since, in an example, the height of the loading space unit 508 is the same as the height of the input feature map, the CNN processing apparatus may perform sliding of the loading space unit 508 in the input 501 incrementally in units of the stride in the width direction, e.g., by W number of times when a stride is 1, and with each sliding operation a corresponding operation of the respective input elements, of each slide or of each corresponding loading space unit, and kernel elements of one or more kernels of a kernel set may be performed to implement respective convolutions between the input 501 and the kernel elements of the one or more kernels of the kernels set to generate the output.

The CNN processing apparatus may allocate an input buffer corresponding to a loading space unit, for example. The CNN processing apparatus may determine a length of the input buffer based on the loading space unit. Referring to FIG. 5B, since a size of the loading space unit is K*H*C, the CNN processing apparatus may allocate an input buffer 509 corresponding to a length of K*H*C. In this example, the input buffer 509 may have a singular width and the length of K*H*C.

Referring back to FIG. 1, in operation 102, to perform a convolution operation between one or more kernel maps and an input, the CNN processing apparatus may load target input elements corresponding to a target loading space among at least one loading space, e.g., the loading space 508, from the input and store the target input elements in an input buffer, e.g., input buffer 509, corresponding to the loading space unit for the loading space. Thus, the target loading space indicates a space corresponding to a target of loading for a sliding process of a convolution operation, and the target input elements indicate input elements included in the target loading space that are selected or determined to be loaded into the input buffer for the convolution operation.

Referring to FIG. 5B, the CNN processing apparatus loads target input elements 510 corresponding to a target loading space 507 from the memory 502 in an initial performing of a sliding of the loading space unit 508 in the input 501, e.g., with subsequent target input elements being loaded corresponding to a next target loading space in the input 501 as incremented according to the stride in the width direction of the input 501. Thus, the CNN processing apparatus may store the target input elements 510 loaded from the memory 502 in the input buffer 509. Similarly, the example loaded subsequent target input elements may be stored in another allocated input buffer or the same input buffer 509 overwriting the stored target input elements 510 in the input buffer 509. The CNN processing apparatus performs convolutional operations between one or more kernel maps of the kernels of the kernel set, e.g., between all kernel maps of all kernels of the kernel set, and the target input elements 510 stored in the input buffer 509. When the operations corresponding to the target input elements 510 are terminated, the CNN processing apparatus determines the subsequent loading space by sliding the loading space unit 508 in the input 501 based on the stride. The CNN processing apparatus loads input elements corresponding to the subsequent loading space from the memory 502 and stores the loaded input elements in the input buffer 509 generated in advance.

The CNN processing apparatus uses the pre-generated input buffer 509 and thus, may omit an operation of generating an additional input buffer to be used for each convolution operation for each kernel map of the same input elements. As described above, because the height of the loading space unit 508 is the same as the height of the input feature map, the CNN processing apparatus may repetitively perform an operation of storing the loaded target input elements in the input buffer 509 W times when the stride is 1, with the respective convolutional operations for each kernel map being performed with each target input element respectively loaded into the input buffer 509 or into respectively allocated input buffers 509, such as where plural convolutional operations between a kernel map and different loading spaces stored in different input buffers 509 are performed in parallel. Herein, in such examples where target input elements are loaded into an allocated input buffer for different loading spaces for a convolution operation of at least one kernel map with the example target input elements of the different loading spaces, this loading may correspond to either or both of respective target input elements of the different loading spaces being loaded in to a same allocated input buffer or respective target input elements being loaded into two or more respective input buffers for performing the convolution operation of the example at least one kernel map and the example target input elements of the different loading spaces. With the stored order of the input elements of the input in a memory and selective loading of corresponding loading spaces of the input a typical convolution operation of sliding a kernel map across the input may alternatively be performed through respective multiplication operations of the selectively loaded input elements from the memory into the example input buffer 509, e.g., according to the example loading spaces that may be dependent on the stride, and loaded kernel elements of one or more kernel maps. Again, as noted above, the allocated input buffer(s) may be allocated memory portions of any memory of the CNN processing apparatus, including a main memory or a local memory logically or physically separate from the main memory. The input buffer(s) may also be referred to as temporary buffers or memories.

Referring back to FIG. 1, in operation 103, the CNN processing apparatus performs the convolution operation based on operation results corresponding to the target input elements stored in the input buffer and the one or more kernel maps of the kernels of the kernel set.

Figure 5C:
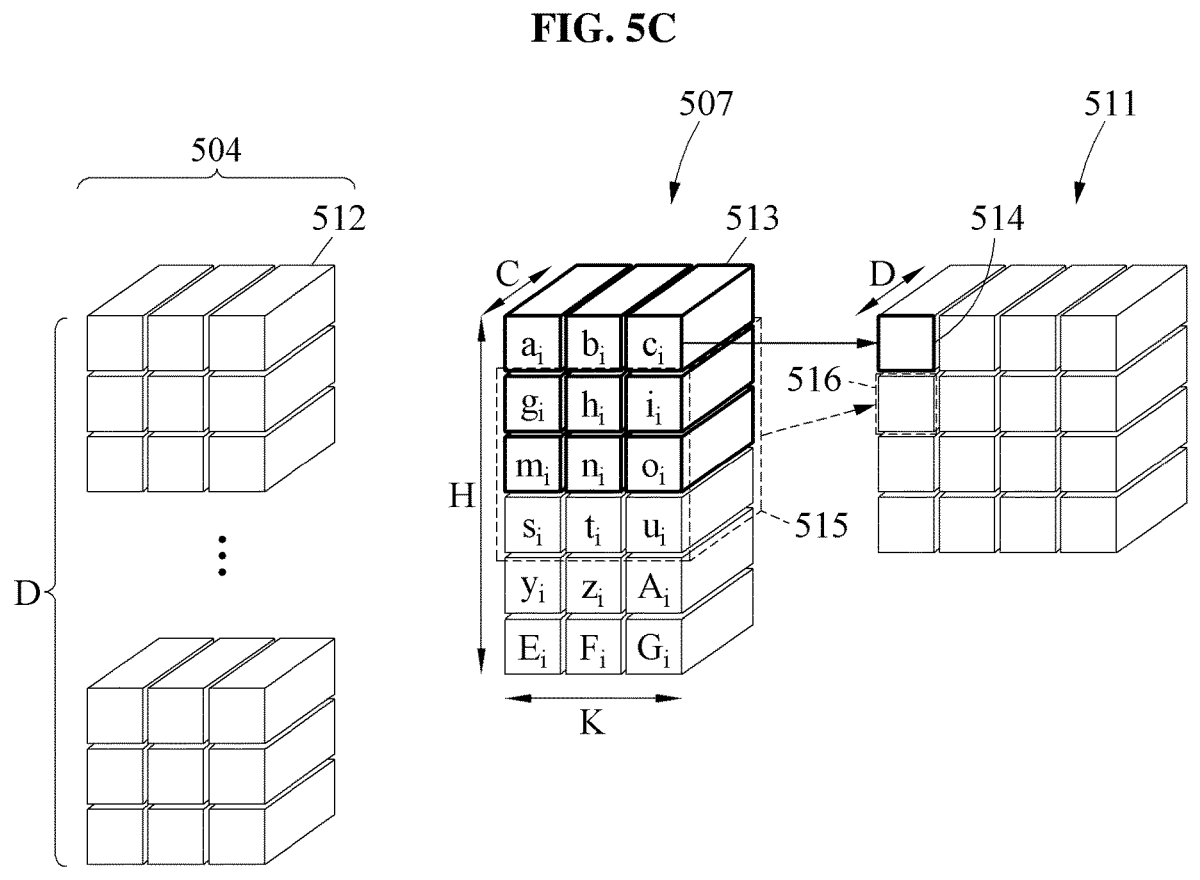

FIG. 5C is a diagram illustrating an example of operations of input elements stored in an input buffer in accordance with one or more embodiments.

Referring to FIG. 5C, the CNN processing apparatus performs convolutional operations between the kernel set 504 and target input elements included in the aforementioned example target loading space 507 in the example input 501 using an input buffer. For example, using the above example input buffer(s) 509, the CNN processing apparatus performs multiplication operations between kernel maps of a kernel 512 corresponding to a first output channel of output 511 and a portion 513 (e.g., the third order tensor corresponding to the illustrated $a_i$ through $o_i$ plural channel input elements) of the input 507 as the target input elements to generate an output element 514. Also, the CNN processing apparatus performs multiplication operations between the kernel maps of the kernel 512 and a portion 515 (e.g., the third order tensor corresponding to the illustrated $g_i$ through $u_i$ plural channel input elements) as another target input elements to generate an output element 516. Similarly, the CNN processing apparatus performs respective multiplication operations between the kernel maps of the kernel 512 and each of similar select portions of the another target loading space of the example input 501, such as corresponding to target loading space 408 of FIG. 4B, to generate the respective output elements of the output column 518 of the first output channel of the output 511. This may be repeated until all such operations have been performed for each of the determined target loading spaces. Thus, the CNN processing apparatus generates output elements included in an output 511 by respectively performing operations between target input elements stored in the input buffer(s) and the kernel maps of kernels of the kernel set 504. An order or scheme of performing an operation may be applied by adopting various techniques and methods according to design intent, and is not limited to the examples of the illustrated constituents.

Figure 6A:
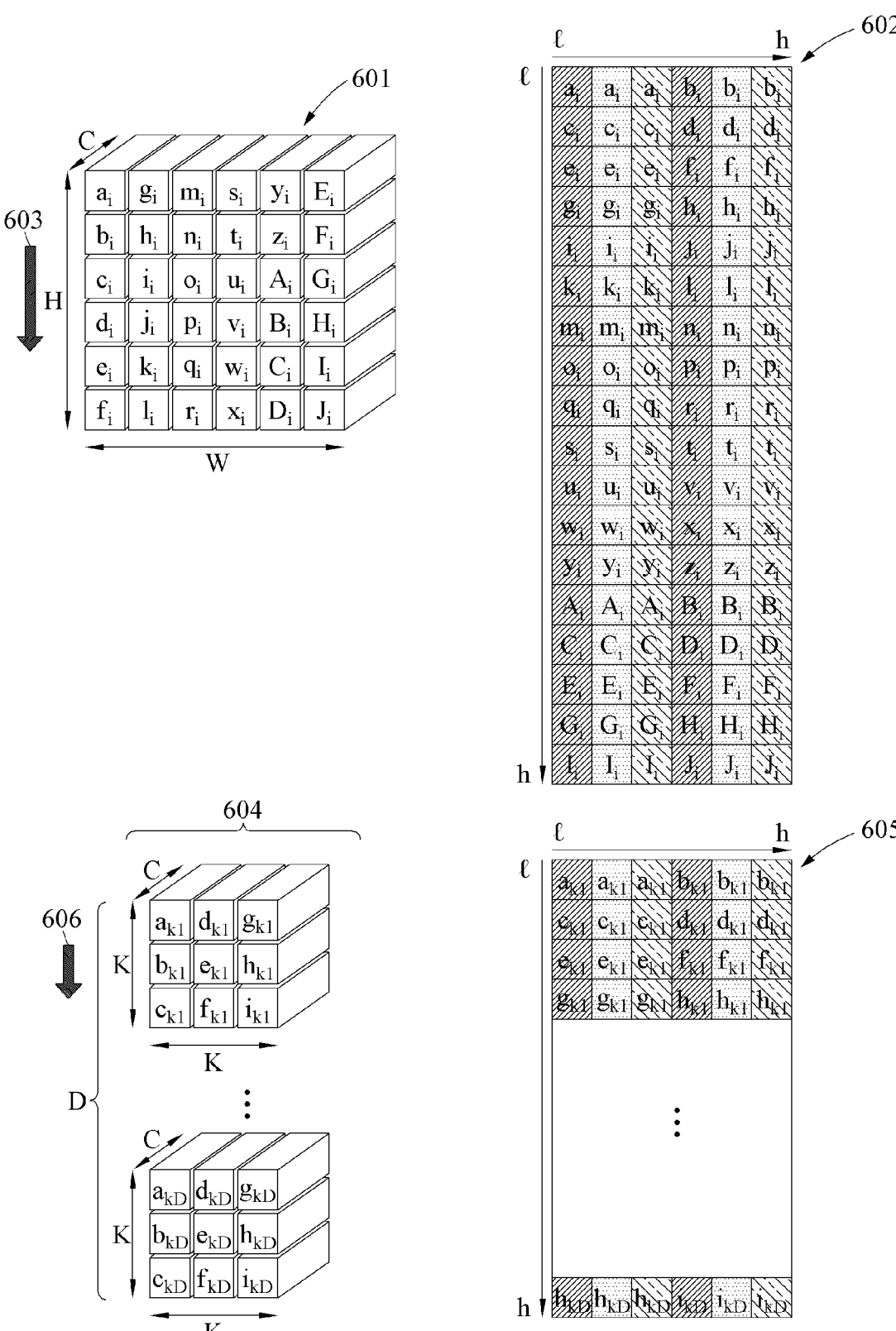
FIG. 6A is a diagram illustrating an example of directional storing of input elements and/or kernel elements in accordance with one or more embodiments.

FIG. 6A is a diagram illustrating an example of directional storing of input elements and/or kernel elements in accordance with one or more embodiments.

Referring to FIG. 6A, input elements included in an input 601 are interleaved so as to be consecutively stored in a memory 602. Compared to the example input 501 of FIG. 5 where an illustrated indexed first row of input elements for channels of the input 501 use the connotation $a_i$, $b_i$, $c_i$, $d_i$, $e_i$, and $f_i$, and a first column of the input elements for the channels of the input 501 use the connotation $a_i$, $g_i$, $m_i$, $s_i$, $y_i$, and $E_i$, to demonstrate row and column input element correspondence with the stored interleaving of the corresponding input elements in the memory 502, the input 601 alternatively illustrates an indexed first row of input elements for channels of the input 601 using the connotation $a_i$, $g_i$, $m_i$, $s_i$, $y_i$, and $E_i$, and a first column of the input elements for the channels of the input 601 using the connotation $a_i$, $b_i$, $c_i$, $d_i$, $e_i$, and $f_i$, to demonstrate row and column input element correspondence with the stored interleaving of the corresponding input elements in the memory 602. As only an example, the CNN processing apparatus may select between storing approaches for the same input, in which case the example input elements $a_i$, $b_i$, $c_i$, $d_i$, $e_i$, and $f_i$ and of input 501 may respectively be the same as the example input elements $a_i$, $g_i$, $m_i$, $s_i$, $y_i$, and $E_i$ of input 601, and the example input elements $g_i$, $m_i$, $s_i$, $y_i$, and $E_i$ of input 501 may respectively be the same as the example input elements $b_i$, $c_i$, $d_i$, $e_i$, and $f_i$ of input 601, such as being loaded from a memory, provided or derived from an output of a previous layer, or provided from one or more sensors of the CNN processing apparatus. Thus, for example, input elements corresponding to the same position in different input feature maps of the input 601 are reorganized and interleaved so as to be consecutively stored in the memory 602. Similar to the above discussion regarding FIG. 5A, the number of input channels in the input 601 is 3, for example, C=3, an input element a corresponding to a first input channel, an input element $a_i$ corresponding to a second input channel, and an input element $a_i$ corresponding to a third input channel are interleaved so as to be consecutively stored in the memory 602, with an input element $b_i$ corresponding to the first input channel, an input element $b_i$ corresponding to the second input channel, and an input element $b_i$ corresponding to the third input channel being reordered/reorganized, subsequent to the example input element $a_i$ corresponding to the third input channel, and interleaved by channel so as to be consecutively stored in the memory 602.

Thus, in the example of FIG. 6A, input elements included in the input 601 are consecutively stored in the memory 602 in a height direction 603 of the input 601. A case in which the input elements are consecutively stored in the memory 602 in the height direction 603 includes a case in which input elements corresponding to the same position in different input feature maps of the input 601 are consecutively stored, and other input elements corresponding to a row of the same position and a subsequent column of a row of the same position are stored in the memory 602 subsequently to the input elements corresponding to the same position, such as in a vertical rasterizing manner. When the number of input channels of the input 601 is 3, for example, C=3, input elements $a_i$ for each of the first through third input channels are interleaved to be consecutively stored in the memory
602, then input elements b$_i$ (positioned in a row below a$_i$) for
each of the first through third input channels are interleaved
to be consecutively stored in the memory 602, and then each
of the remaining input elements are respectively similarly
consecutively stored in the memory 602 in the height
direction. In this example, it may also be expressed that the
input elements included in the input 601 are interleaved in
the height direction 603 to be stored in the memory 602, e.g.,
compared to the input elements in the input 501 of FIG. 5A
being interleaved in the width direction 503. The foregoing
description regarding FIG. 5A is also applicable to the
memory 602 that stores data in an indexed order from lower
(I) to higher (h) indices, and not repeated here merely for
brevity purposes. Thus, for example, the memory 602 stores
input elements in a similar order "a$_i$, a$_i$, a$_i$, b$_i$, b$_i$, b$_i$, c$_i$, c$_i$,
c$_i$, . . . , J$_i$, J$_i$, J$_i$", while again noting that input elements b$_i$,
c$_i$, and J$_i$ of FIG. 6A would correspond to input elements g$_i$,
m$_i$, and J$_i$ of FIG. 5A. In each of the examples of FIGS. 5A
and 6A, data is distinguished for each input channel corresponding to the same position.

Referring to FIG. 6A, kernel elements included in a kernel
set 604 may be stored in a memory 605 to correspond to
input elements included in the input 601 and for a corre-
sponding convolution operation of a convolutional layer of
the CNN processing apparatus. Similarly or identically to
the input elements stored in the memory 602, kernel ele-
ments included in the kernel set 604 are interleaved and
reorganized to be consecutively stored in the memory 605.
Similar to above, it is noted that though the example interleaving and reorganizing storing approach may be
selected to be implemented by the CNN processing appa-
ratus, the example kernel elements a$_{k1}$, b$_{k1}$, c$_{k1}$, d$_{k1}$, e$_{k1}$, f$_{k1}$,
g$_{k1}$, h$_{k1}$, i$_{k1}$, . . . a$_{kD}$, b$_{kD}$, . . . i$_{kD}$ of the example first kernel
of the kernel set 504 of FIG. 5A may respectively be the
same as the example kernel elements a$_{k1}$, d$_{k1}$, g$_{k1}$, b$_{k1}$, e$_{k1}$,
h$_{k1}$, c$_{k1}$, f$_{k1}$, i$_{k1}$, . . . a$_{kD}$, d$_{kD}$, g$_{kD}$, b$_{kD}$ . . . i$_{kD}$ of the example
first kernel of the kernel set 604 of FIG. 6A, as trained
parameters for the convolutional layer and loaded from a
memory, for example. In addition, the kernel elements may
be previously stored in the memory 605, e.g., prior to the
storing of the input elements in the memory 602, based on
the determined loading space unit. As noted, the kernel
elements also correspond to a predetermined convolutional
layer, such as trained parameters of the predetermined
convolutional layer and generated during a training opera-
tion of the CNN processing apparatus. The aforementioned
selecting may be between storing schemes of storing input
elements and/or the kernel elements, such as selected
between the schemes of FIGS. 5A, 5B, 6A, and 6B, any
typical scheme, or other tensor unrolling scheme. The selec-
tion of the respective storing schemes may be previously
made before operation of the CNN for a trained objective for
an input, e.g., for each convolutional layer. The scheme may
be dependent on other factors or considerations made at the
time of such an operation of the CNN and/or dependent on
factors or settings made during training of the CNN, as only
examples.

Similar to the above discussion of FIG. 5A., portions of
which are not repeated here for brevity purposes, kernel
elements corresponding to the same position in different
kernel feature maps of the kernel set 604 may be interleaved
to be consecutively stored in the memory 605. When the
number of kernel feature maps of a first kernel included in
the kernel set 604, for example, the number of input channels is 3, for example, C=3, a kernel element a$_{k1}$ correspond-
ing to a first input channel of the first kernel of the kernel set

504, a kernel element a$_{k1}$ corresponding to a second input
channel of the first kernel of the kernel set 504, and a kernel
element a$_{k1}$ corresponding to a third input channel of the first
kernel of the kernel set 504 are interleaved to be consecu-
tively stored in the memory 605.

The kernel elements included in the kernel set 604 may
further be similarly or identically consecutively stored in the
memory 605, e.g., overwriting or consecutively appended in
the same allocated memory 605 and/or in one or more other
allocated memories 605, in a direction 606 corresponding to
the height direction 603 in which the input elements are
stored in the memory 602 for the corresponding convolution
operation between the respective kernels and the input 601.
In the example where the kernel elements are stored, e.g.,
previously stored, in the memory 605 based on the scheme
used to store the input elements in memory 602, the CNN
processing apparatus loads the corresponding kernel ele-
ments of each kernel of each kernel set, prestored for each
convolutional layer, from the memory 605, or respective
memories 605 for each convolutional layer, so as to use the
kernel elements for the respective convolution operations.
For example, the respective kernel maps for one or more or
all kernels of a particular kernel set may be loaded from the
memory 605 for performance of convolution operations of a
particular convolutional layer of the CNN of the CNN
processing apparatus, the loaded kernel elements of the
kernel maps may be loaded to an correspondingly allocated
buffer or temporary memory of the CNN processing appa-
ratus, for example. The example scheme of FIG. 6A of
consecutively storing kernel elements in the direction 606
may be based on a principle that convolution of kernel maps
with the input elements of the input 601 may be performed
through multiplication of kernel elements, loaded from
memory 605, with input elements stored in an input buffer,
loaded from the memory 602, if the kernel elements are
interleaved and reorganized in the memory 605 in accor-
dance with the storing scheme of the input elements in the
memory 602 in the height direction 603 for the performance
of the convolution of kernel maps with the input elements of
the input 601. The respective kernels included in the kernel
set 604 may be consecutively stored in the memory 605
based on the same principle, and so kernels corresponding to
output channels are sequentially loadable from the memory
605 in an order of the output channels, such as when the
CNN processing apparatus generates the output channels of
the output in sequence. Alternatively, in an example, kernels
may be selectively loadable from the memory 605, or loaded
from separate memories 605, for generating the output
channels respectively in parallel.

Figure 6B:
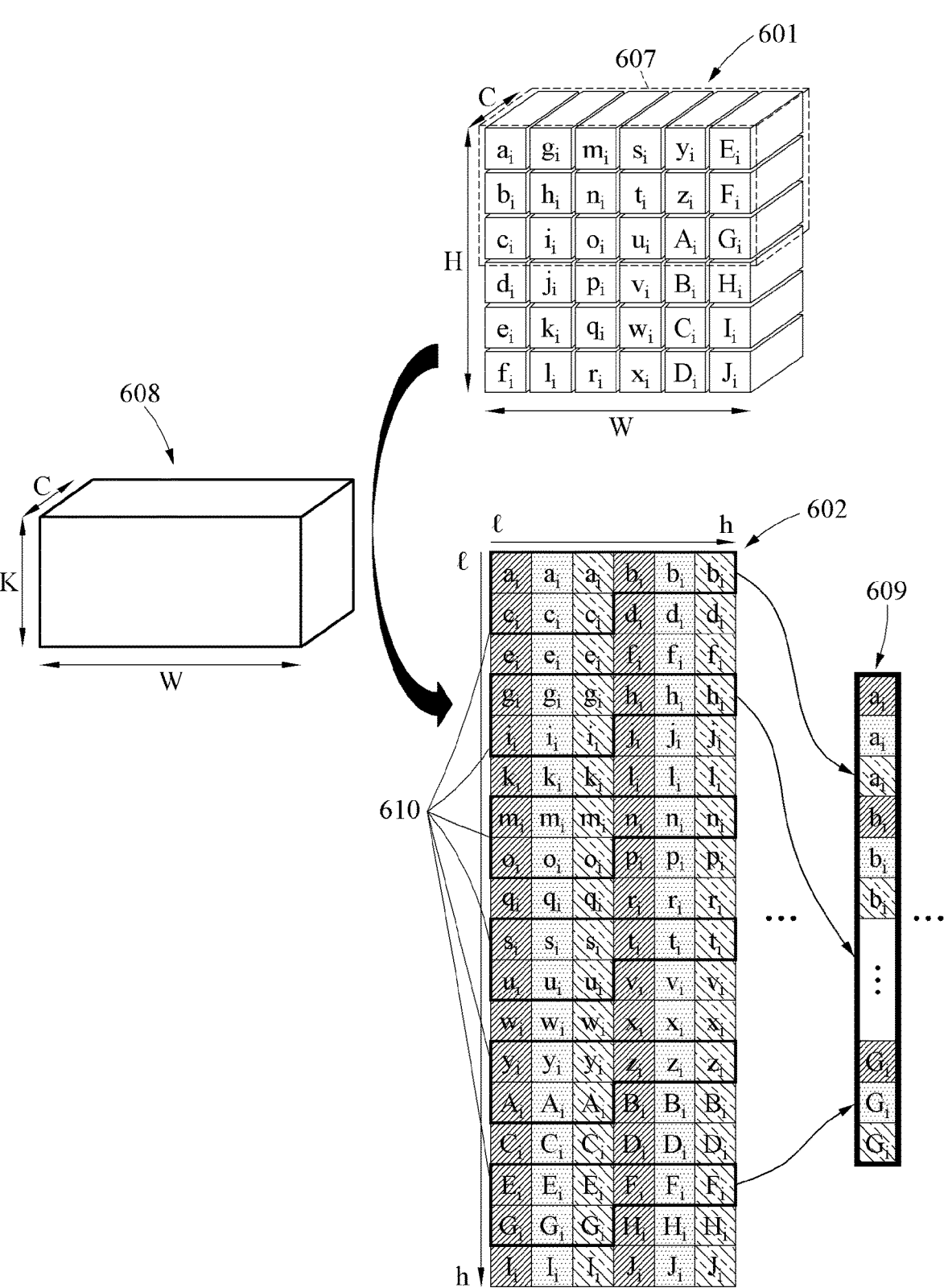
FIG. 6B is a diagram illustrating an example of an operation of generating an input buffer and storing input elements in the generated input buffer in accordance with one or more embodiments.

FIG. 6B is a diagram illustrating an example of an
operation of allocating an input buffer and storing input
elements in the allocated input buffer in accordance with one
or more embodiments.

Referring to FIG. 6B, when input elements in the input
601 are interleaved and reorganized to be consecutively
stored in the memory 602 in a height direction of the input
601, such as discussed above with respect to FIG. 6A, the
CNN processing apparatus may determine a loading space
unit 608 based on a width of an input feature map of the
input 601. Kernel elements in a kernel set are previously
stored in a memory to correspond to input element in the
input 601, such as stored in memory 605 of FIG. 6A. As
described above, the kernel elements in the kernel set may
also be interleaved by channel in the height direction to be
consecutively stored in the example memory 605 in
advance.

The CNN processing apparatus may determine a depth of the loading space unit 608 based on the number of input channels of the input 601, determine a height of the loading space unit 608 based on a height of a kernel feature map or a kernel of the kernel set, such as the kernel set 604 of FIG. 6A, and determine a width of the loading space unit 608 based on a width of an input feature map. Referring to FIG. 6B, when the number of input channels is C, the height of the kernel feature map is K, and the width of the input feature map is W, the CNN processing apparatus determines the depth, the height, and the width of the loading space unit 608 to be C, K, and W, respectively. In this example, a size of the loading space unit 608 is W*K*C.

Similar to above, to reduce a data redundancy due to overlapping loading spaces, the CNN processing apparatus may thus determine the width of the loading space unit 608 to be the same as the width of the input feature map. The CNN processing apparatus may thus generate or select the loading space unit 608 to have the same width as the width of the input feature map. In this example, the CNN processing apparatus may set the height of the loading space unit 608 to be the same as the height of the kernel feature map in consideration of a consecutiveness of the kernel elements stored in the memory, e.g., in memory 605 of FIG. 6A. Since the width of the loading space unit 608 is the same as the width of the input feature map, the CNN processing apparatus may perform sliding of the loading space unit 608 in the input 601 incrementally in units of the stride in the height direction, e.g., by H number of times when the stride is 1, and with each sliding operation a corresponding operation of the respective input elements, of each slide or of each corresponding loading space unit, and kernel elements of one or more kernels of a kernel set may be performed to implement respective convolutions between the input 601 and the kernel elements of the one or more kernels of the kernels set to generate the output. This may be similar to operations discussed above with respect to FIG. 5B, though sliding in this example is in the height direction, and thus remaining discussions above regarding the loading of select or determined input elements loaded into the example input buffer(s) 509 discussed above are also applicable, all discussions of which may not repeated merely for brevity purposes.

Thus, briefly, referring to FIG. 6B, since a size of the loading space unit is W*K*C, the CNN processing apparatus may allocate an input buffer 609 with a length of W*K*C. The CNN processing apparatus loads target input elements 610 corresponding to a target loading space 607 from the memory 602 through the sliding of the loading space unit 608 in the input 601, such as through the illustrated example first sliding operation selecting or determining input elements of target loading space 607, before or in parallel or independently with each of the remaining target loading spaces as the loading space unit 608 is incrementally slid across the input 601 based on the stride. The CNN processing apparatus may store the target input elements 610 loaded from the memory 602 in the input buffer 609. Likewise, subsequent or other target input elements corresponding to other target loading spaces may be loaded into the input buffer 609 and/or one or more other similarly allocated input buffers 609. The CNN processing apparatus performs operations between the kernel set and the target input elements 610 stored in the input buffer 609. In a sequential operation example, when the operations corresponding to the target input elements 610 have completed, the CNN processing apparatus may then determine the subsequent loading space by sliding the loading space unit 608 in the input 601 based on the stride. The CNN processing apparatus loads input elements corresponding to the subsequent loading space from the memory 602 and stores the loaded input elements in the input buffer 609 generated in advance. Alternatively, in a parallel operation example, respective target input elements of different target loading spaces may be respectively stored in two or more input buffers 609 and the operations between the kernel sets and the respective target input elements may be performed in parallel.

In either example, the CNN processing apparatus may reuse the generated input buffer(s) 609 for plural kernel maps of the kernels of the kernel set, and thus, may omit an operation of generating an additional input buffer to be used for each convolution operation. For example, an operation of reloading the same input elements for each convolution operation of each kernel map or kernel may be omitted. Also, as described above, in the example sequential operation, because the width of the loading space unit 608 is the same as the width of the input feature map, and with the stride being 1, the CNN processing apparatus may repetitively performs an operation of storing respective loaded target input elements in the example input buffer 609 H times to complete a convolution operation between the input 601 and one or more or all kernels of the kernel set for the corresponding convolutional layer of the CNN of the CNN processing apparatus.

Figure 6C:
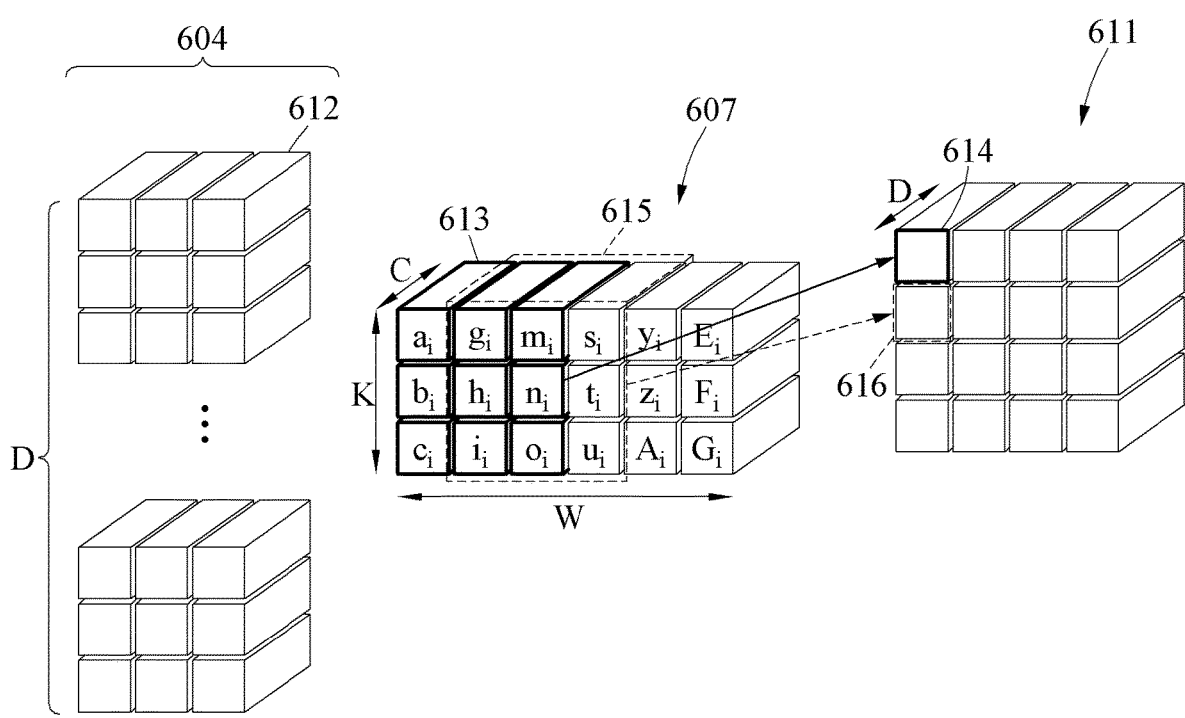
FIG. 6C is a diagram illustrating an example of operations of input elements stored in an input buffer in accordance with one or more embodiments.

FIG. 6C is a diagram illustrating an example of operations of input elements stored in an input buffer in accordance with one or more embodiments.

Referring to FIG. 6C, the CNN processing apparatus performs operations between the kernel set 604 and target input elements included in the target loading space 607 in an input using an input buffer. Noting that the target loading space 607 is differently configured than the target loading space 507 of FIG. 5C, and that input elements may be loaded for the target loading space 607 based on an interleaving and reordering/reorganizing of input elements compared to the aforementioned discussed interleaving example of FIGS. 5A-5C, remaining discussion above with respect to FIG. 5C are applicable to FIG. 6C, though not repeated here for brevity purposes. Accordingly, for example, the CNN processing apparatus performs convolutional operations between a kernel 612 corresponding to a first output channel and a portion 613 of the target input elements to generate an output element 614. For example, using the above example input buffer(s) 609, the CNN processing apparatus may perform multiplication operations between kernel maps of the kernel 612 and a portion 615 (e.g., the third order tensor corresponding to the illustrated $a_i$, $g_i$, $m_i$, $b_i$, $h_i$, $n_i$, $c_i$, $i_i$, and $o_i$ plural channel input elements) of the input 607 of the target input elements to generate an output element 616. The CNN processing apparatus generates output elements included in an output 611 by performing operations between target input elements stored in the input buffer and the kernel set 604. An order or scheme of performing an operation may be applied by employing various techniques and methods according to design intent, and is not limited to the examples of the illustrated constituents.

Figure 7:
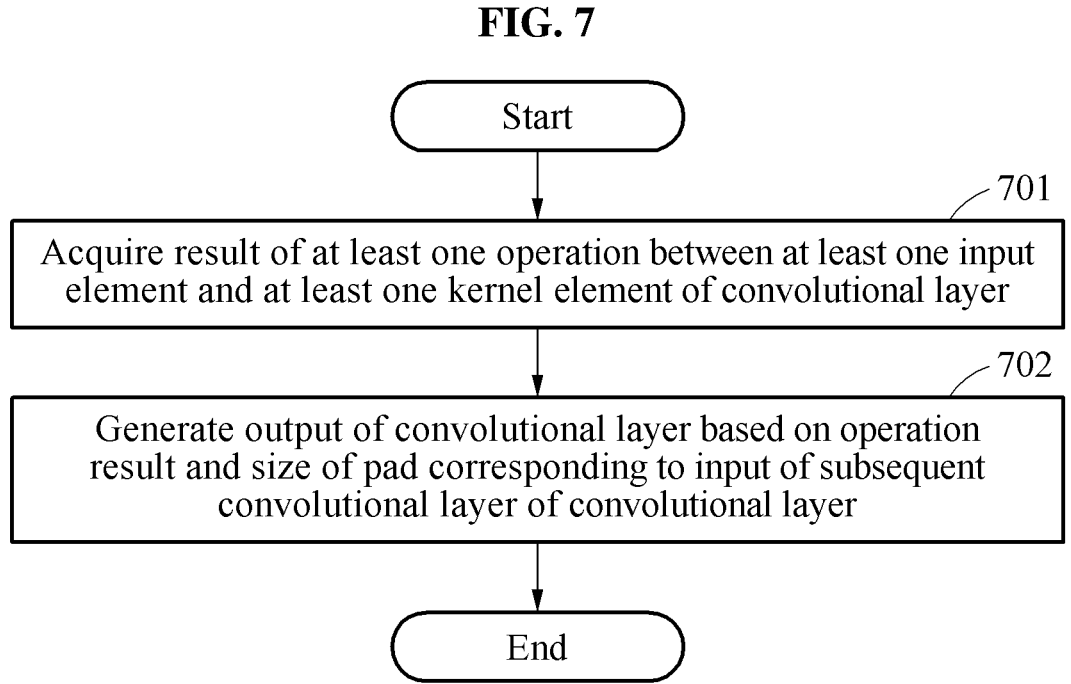
FIG. 7 is a flowchart illustrating an example of a CNN processing method in accordance with one or more embodiments.

FIG. 7 is a flowchart illustrating an example of a CNN processing method in accordance with one or more embodiments.

Referring to FIG. 7, in operation 701, a CNN processing apparatus acquires a result of at least one operation between at least one input element and at least one kernel element. For example, the CNN processing apparatus applies a bias to a result of a multiply-and-accumulation (MAC) operation with respect to an input element and a kernel element.

In operation 702, the CNN processing apparatus generates an output of a convolutional layer based on such operation results and a size of a pad corresponding to an input of a subsequent convolutional layer of the convolutional layer. Thus, the size of the output of the convolutional layer is defined based on a size, or expected/trained size, of the input of the subsequent convolutional layer, e.g., the output of the convolutional layer is defined to have the same size as the input to the subsequent convolutional layer or an expected/trained input size of an example one or more pooling or sub-sampling layers to which the output of the convolutional layer is provided and which may resample the output to another size that may be the same as the input of the subsequent convolutional layer. In this example, padding may also be applied upon or after output of the convolutional layer or upon input to the subsequent convolutional layer to match the size of the pad corresponding to the input of the subsequent convolutional layer.

Thus, the CNN processing apparatus may generate, or be configured and/or trained to generate, the output of the convolutional layer in a size in consideration of the padding that may be applied to the input of the subsequent convolutional layer. In this example, the CNN processing apparatus may selectively not process or consider, or may skip, the applied padding in the input to the subsequent convolutional layer when performing the corresponding convolution operations of the subsequent convolutional layer. An operation of generating the output of the convolutional layer will also be described with reference to FIG. 8.

Figure 8:
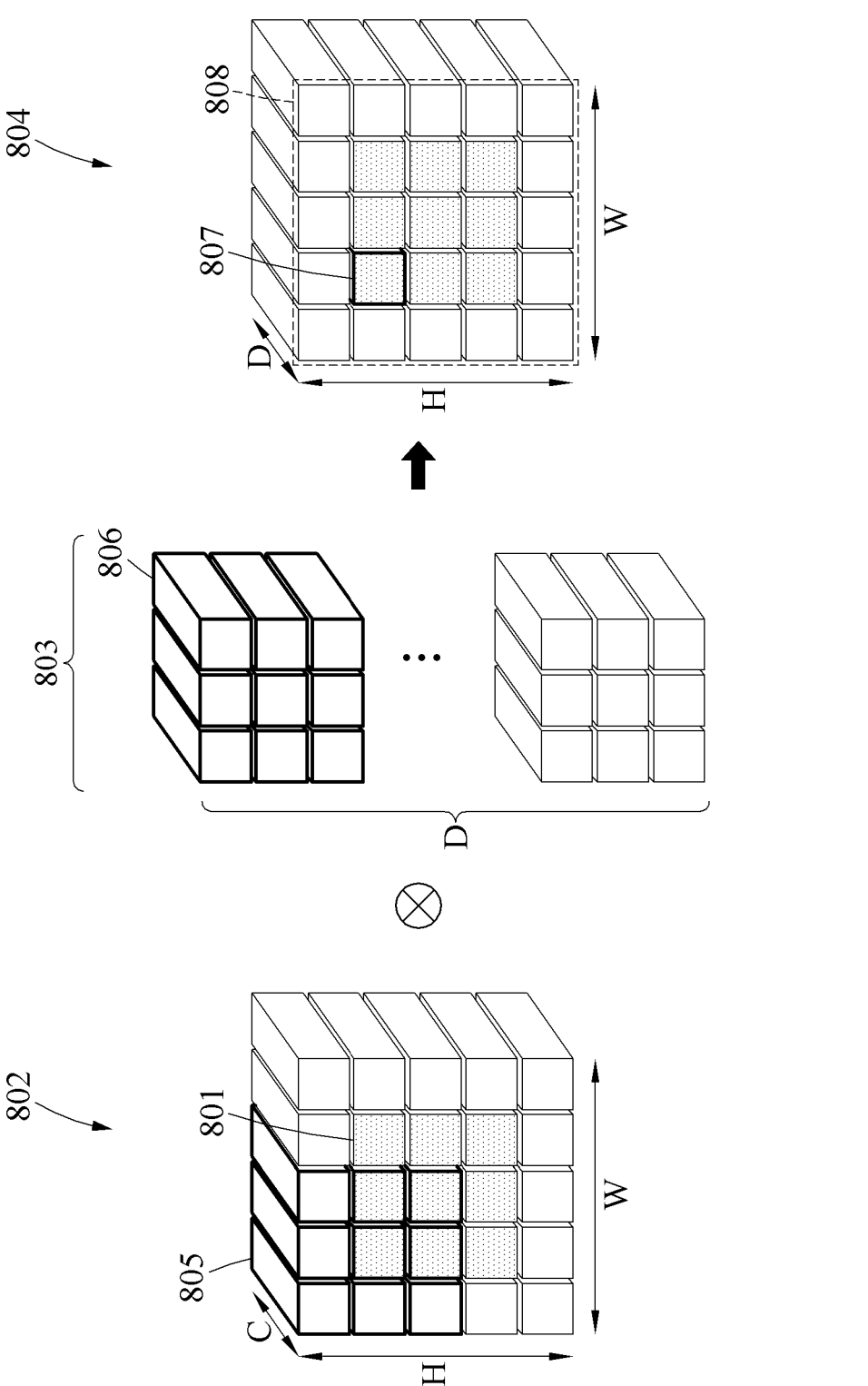
FIG. 8 is a diagram illustrating an example of a CNN processing method in accordance with one or more embodiments.

FIG. 8 is a diagram illustrating an example of a CNN processing method in accordance with one or more embodiments.

Referring to FIG. 8, a CNN processing apparatus performs a convolution operation between a kernel set 803 and an input 802 of a convolutional layer to generate an output 804 of the convolutional layer. As described above, the CNN processing apparatus may generate the output 804 based on, or in consideration of, a size of a pad corresponding to a subsequent convolutional layer. The CNN processing apparatus may also generate the output 804 corresponding to a size of an input, of a subsequent layer, to which padding is applied. When the size of the padding-applied input to the subsequent layer is W*H*D, the CNN processing apparatus performs the current convolution operation between the kernel set 803 and the input 802 having a size of W*H*C to generate the output 804 in a size of W*H*D. In this example, the input 802 may have also been obtained by applying such padding to an input 801, so the input 802 has the size of W*H*C, e.g., where the padding may have been applied or generated through an output of a previous convolutional layer, subsequent to such output, or the padding may be applied to the input 801 or the previous output to generate the input 802, with the applied padding, in the current convolutional layer.

The CNN processing apparatus generates an output element 807 in an output feature map 808 based on operations between input elements 805 and a kernel 806, for example. The CNN processing apparatus maps operation results to the output element 807 in the output feature map 808, e.g., in which padding has been applied or provided based on a size of a pad of the subsequent convolutional layer. As plural convolutional operations are performed through respective kernel maps of the kernel 806, for example, values of the output element 807 may be repetitively updated upon completion of each such convolution, or the results of each of such convolutions may be considered preliminary values of the output element 807 and the final output element 807 value may be determined by considering or accumulating each of the preliminary values of the output element 807. As described above, since the CNN includes a plurality of convolutional layers, the CNN processing apparatus may generate one or more or all respective outputs of each of the convolutional layers based on a pad corresponding to the respective input of each subsequent convolutional layer for each of the convolutional layers. In an example, parameters of the CNN may be stored in a memory of the CNN processing apparatus, with some of those parameters including the example kernel elements and such padding or input/output pad sizes, so the CNN processing apparatus may be implemented to load the parameters to configure one or more processors of the CNN processing apparatus to comprise the one or more convolutional layers and implement each of the respective convolutions and any input/output paddings for any acquired and/or loaded input data provided to the configured CNN or respective convolutional layers.

Figure 9:
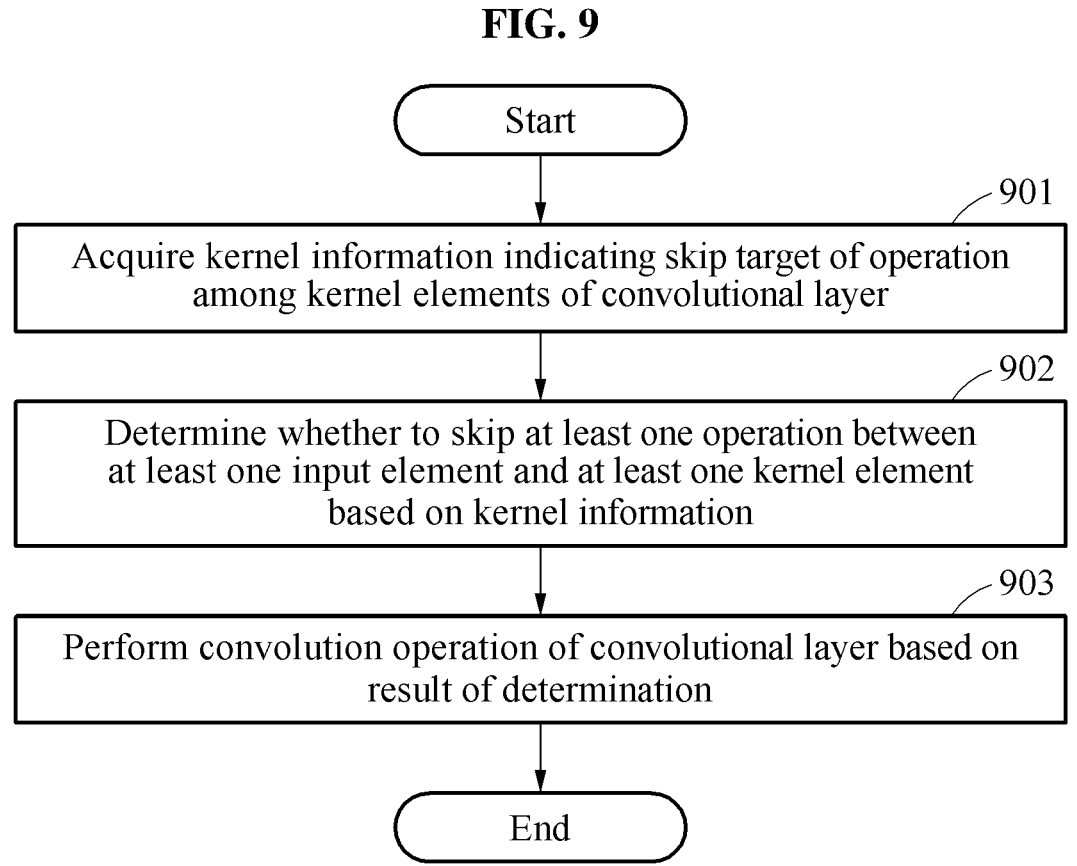
FIG. 9 is a flowchart illustrating an example of a CNN processing method in accordance with one or more embodiments.

FIG. 9 is a flowchart illustrating an example of a CNN processing method in accordance with one or more embodiments.

Further to the example discussion above with respect to FIG. 8, and referring to FIG. 9, in operation 901, a CNN processing apparatus may acquire, determine, or load kernel information, which may indicate a skip target of an operation among kernel elements for a convolutional layer. The skip target may be a kernel element that is a determined target of an operation to be skipped in a corresponding convolution operation. Thus in an example, such kernel information may be information associated with the skip target. Examples of such kernel information will be also described with reference to FIGS. 10A and 10B.

Figure 10A:
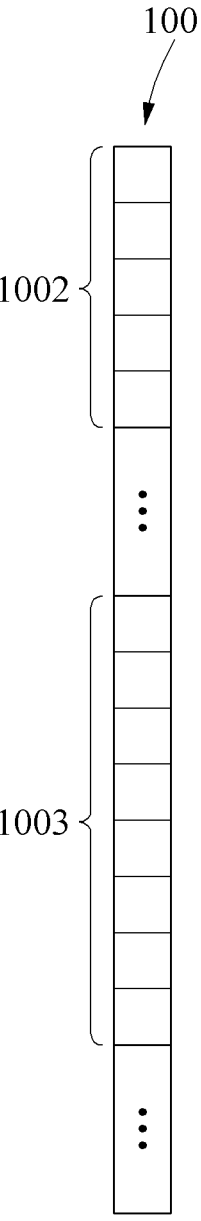
FIGS. 10A and 10B are diagrams illustrating examples of kernel information in accordance with one or more embodiments.
Figure 10B:
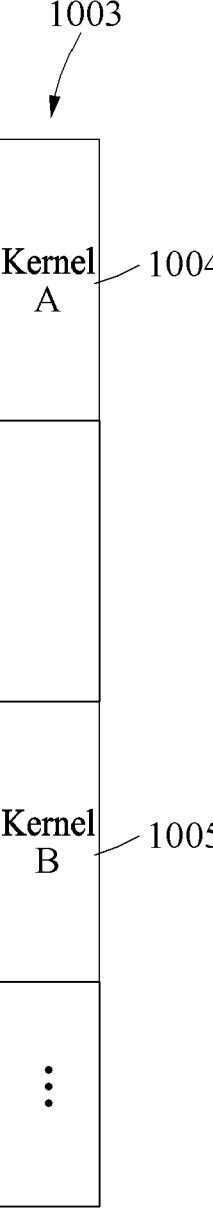

FIGS. 10A and 10B are diagrams illustrating examples of kernel information in accordance with one or more embodiments.

Referring to FIG. 10A, a skip target may include at least one skip target kernel element that is pre-classified or predetermined, e.g., from plural or all kernel elements included in a kernel map, kernel, or kernel set of a convolutional layer. The kernel information may include at least one of a start point of skip target kernel elements 1002 and 1003, e.g., consecutively stored in a memory 1001, and a number of the skip target kernel elements 1002 and 1003. A skip target kernel element is, for example, a kernel element of which a degree of contribution to an output corresponding to a convolution operation satisfies a predefined condition. The skip target kernel element may be defined as, for example, a kernel element whose degree of contribution to the output is determined or predicted, e.g., currently or previously determined or predicted, to be less than a threshold. The skip target kernel element may be defined, for example, as a kernel element that, when convolution is performed or would be performed using or dependent on the kernel element, an output element that is or is predicted to be dependent on that convolution has or is predicted to have a value that is less than a threshold, e.g., when an MAC operation with respect to the skip target kernel element and an input element is performed, or is going to be performed, for convolution involving the kernel element and one or more input elements, e.g., in accordance to the aforementioned convolution operation examples of FIGS. 3 through 8, if an output dependent on the kernel element fails to meet the example threshold then a next convolution may not be performed with respect to the kernel element when the output fails to meet the threshold or if a predicted or expected output dependent on the kernel element would fail to meet the example threshold, then a current convolution may not be performed with respect to the kernel element. Also, the skip target kernel element may also or alternatively be defined as consecutive stored kernel elements according to an aforementioned storing scheme, or consecutive acquired or loaded kernel elements corresponding to a predefined number among consecutive kernel elements, and satisfying at least one of the conditions described above. For example, one or more kernel elements to be skipped may be defined or determined by one or more example target kernel elements that meet one of the above conditions and a predetermined or determined number of kernel elements before, after, or before and after the example target kernel element. A scheme of defining skip target kernel elements may be applied based on various references or considerations depending on embodiment.

Referring to FIG. 10B, the skip target may include at least one skip target kernel that is pre-classified or previously determined, from a kernel included in a kernel set of a convolutional layer, e.g., pre-classified or previously determined as a kernel of which a degree of contribution to an output corresponding to a convolution operation is predicted to or does satisfy or meet a predefined condition. The skip target kernel may also be defined as the foregoing skip target element(s). The kernel information may include at least one of a start point of skip target kernels 1004 and 1005, e.g., consecutively stored in a memory 1003, to be skipped and a number of skip target kernels to be skipped, e.g., by identifying the number of kernels to skip and one or both of skip target kernels 1004 and 1005.

Referring back to FIG. 9, in operation 902, the CNN processing apparatus may determine whether to skip at least one operation between at least one input element and at least one kernel element based on the kernel information. When a skip target included or identified in or determined from the kernel information includes at least one skip target kernel element, the CNN processing apparatus may determine whether to skip consideration of that at least that skip target kernel element, as well as other kernel elements, in a convolution operation that would have otherwise involved the skip target kernel element based on at least one of the also indicated start point or also indicated number of the at least one skip target kernel element. When the skip target includes at least one skip target kernel, the CNN processing apparatus may determine whether to skip consideration of the skip target kernel, or whether to skip one or more other or additional kernels, in a convolution operation that would have otherwise involved the skip target kernel based on a start point of a skip target kernel included or indicated in the kernel information.

In operation 903, the CNN processing apparatus performs a convolution operation of the convolutional layer based on a result of skip target kernel element(s) and/or skip target kernel(s) determination(s). When the skip target includes at least one skip target kernel element, the CNN processing apparatus skips at least one corresponding operation of the convolution corresponding to the skip target kernel element included in the kernel information, while also for example updating at least one output element based on at least one bias corresponding to the skip target kernel element for which the operation was skipped. When the skip target includes at least one skip target kernel, the CNN processing apparatus skips at least one corresponding operation of the convolution corresponding to the skip target kernel included in the kernel information, while also for example updating at least one output element based on at least one bias corresponding to the skip target kernel for which the operation was skipped. In this example, an output channel of the output corresponding to the skipped skip target kernel may have set value(s) corresponding to the at least one bias. As described above, since the CNN includes a plurality of convolutional layers, the CNN processing apparatus may respectively determine for each convolutional layer whether to skip at least one convolutional operation, e.g., a corresponding MAC operation for performing a convolution operation with respect to one or more kernel elements or kernels and one or more input elements, among all convolutional operations of each respective convolutional layer based on the kernel information corresponding to each of the convolutional layers.

Figure 11:
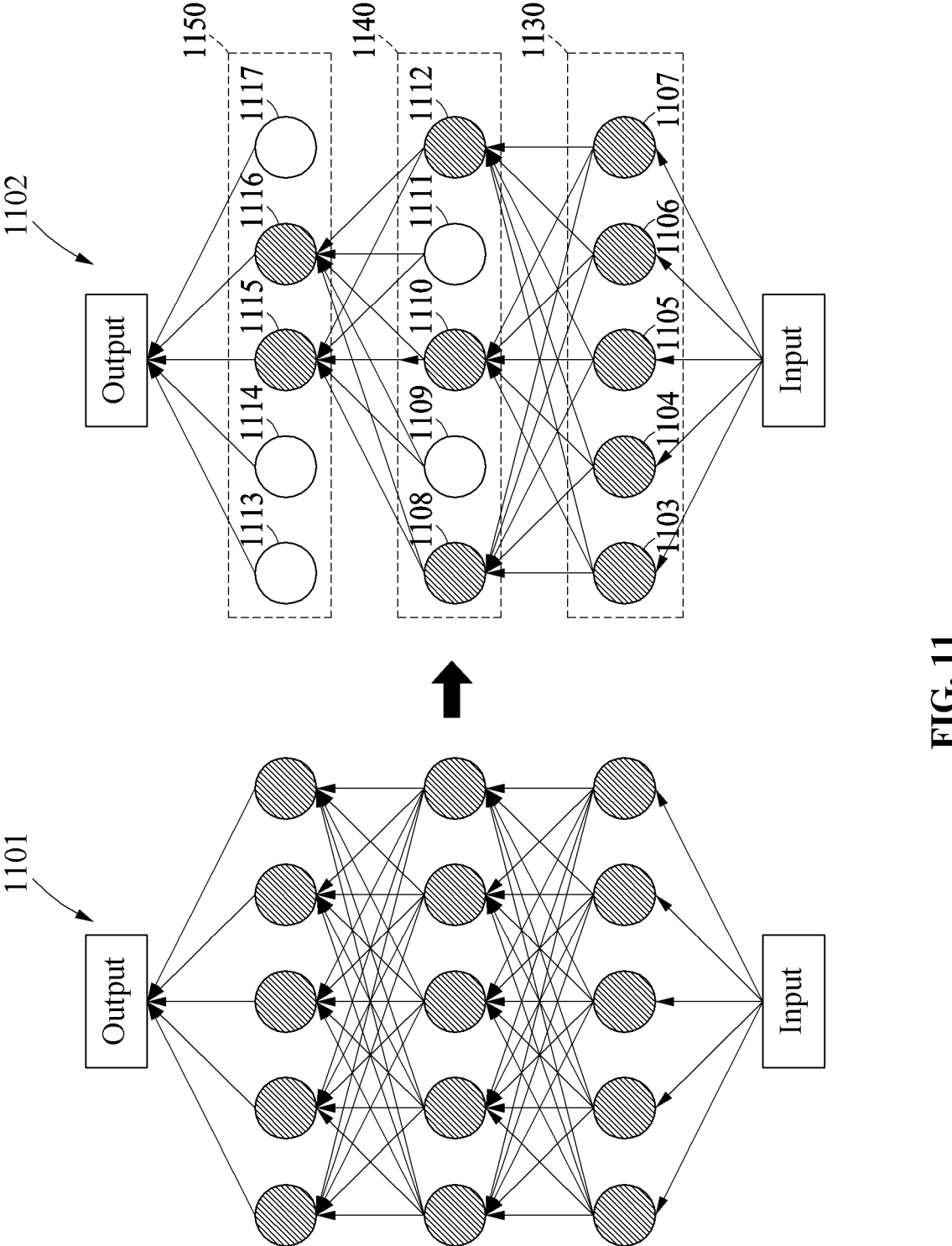
FIG. 11 is a flowchart illustrating an example of a CNN processing method in accordance with one or more embodiments.

FIG. 11 is a flowchart illustrating an example of a CNN processing method in accordance with one or more embodiments.

Referring to FIG. 11, a CNN processing apparatus skips one or more MAC operations corresponding to determined skip target kernels among all kernels included in a CNN. Herein, skipping a MAC operation may include skipping the multiplication or skipping the multiplication and accumulation with respect to a determined skip kernel element, or skipping of multiplications or multiplications and accumulations with respect to a determined skip kernel. Convolutional layers included in a CNN 1101 are respectively configured based on a kernel set corresponding to each of the convolutional layers, e.g., a kernel set trained so the corresponding convolutional layer applying the kernel set performs or achieves one or more trained objectives. Thus, respective outputs of each of the convolutional layers are generated based on, or dependent on, convolutional operations corresponding to the kernels included in the kernel set and input data input to each convolutional layer.

The CNN processing apparatus thus may generate either respective a final outputs respectively using plural convolutional layers, for example, respective first convolutional layers 1130, second convolutional layer 1140, and a third convolutional layer 1150 included in CNN 1102. For example, the example CNN 1101 may be configured to perform all convolution operations for all stored kernels of the corresponding kernel sets of each of the first convolutional layer 1130, the second convolutional layer 1140, and the third convolutional layer 1150, in the similarly illustrated first through third convolutional layers of the CNN 1101, while the example CNN 1102 is configured to not perform all of the convolution operations, by selectively skipping some kernels. The skipping may further include not even loading or storing skipped kernels, so while FIG. 11 demonstrates some nodes corresponding to skipped kernels as not being active or not being provided respective inputs from a previous layer, the CNN 1102 may also be configured without the example nodes corresponding to the skipped kernels. Thus, the CNN may be selectively reconfigured, or differently configured, depending on whether or which nodes corresponding to which kernel elements or kernels are skipped. Thus, in the example of the selectively configured or reconfigured CNN 1102, the CNN processing apparatus determines and then performs the respective convolution operations of the respective convolutional layers with a skipping of select MAC operations that correspond to determined skip target kernels based on kernel information corresponding to the convolutional layers. As noted, each of the nodes included in the CNN 1102 are representative of a single node or a collection of nodes that correspond to or apply/implement different kernels, including first nodes 1103 through 1107 included in the first convolutional layer 1130, second nodes 1108 through 1112 included in the second convolutional layer 1140, and third nodes 1113 through 1117 included in the third convolutional layer 1150. Among the nodes, the second nodes 1109 and 1111 and the third nodes 1113, 1114, and 1117 are determined, and configured or not included as respectively corresponding to "skip target kernels." Thus, the skipped or not active/considered nodes 1109, 1111, 1113, 1114 and 1117 are represented by non-hatched circles and thereby may have been determined to not output values, e.g., when performed in CNN 1101, that may affect the ultimate output of the CNN 1102, and/or they may not be provided input from a previous layer, while the remaining nodes with hatching represent nodes that are not skipped or are active/considered nodes and thereby output values that may affect the ultimate output of the CNN 1102 and are provided input from the previous layer. Alternatively, the CNN 1102 may be configured only with the determined active/considered nodes without the skipped nodes.

Thus, for example, an operation may be performed of an input and by the first node 1103 among the first nodes 1103 through 1107 included in the first convolutional layer 1130, representing that the convolution performed by the first convolutional layer 1130 includes performing convolution operations with respect to all of the kernels corresponding to the first convolutional layer 1130. The illustrated arrows respectively directed from the input toward the first nodes 1103 through 1107 represent connections between an input layer, for example, and the first convolutional layer 1130. Any or each of the illustrated connections between the input layer and each of the nodes of the convolutional layer 1130 may be weighted connections, depending on the training and objective of the CNN. Contrary to the configuration of CNN 1101, in the CNN 1102 the outputs of the nodes 1103 through 1107 are only provided or connected to second nodes 1108, 1110, and 1112, and thus convolution operations of the second convolutional layer 1140 are only being performed between the second nodes 1108, 1110, and 1112 for output feature maps generated based on the first nodes 1103 through 1107 and provided to the second nodes 1108, 1110, and 1112 through connections as indicated by arrows directed from the first nodes 1103 through 1107 toward only the second nodes 1108, 1110, and 1112, among all second nodes 1108 through 1112 of the second convolutional layer 1140. Thus, in this example, output feature maps generated by the first nodes 1103 through 1107 are selectively input to only select nodes of the second convolutional layer 1140. In the convolution operations of the second convolutional layer 1140, only convolutions with respect to kernels implemented or represented by second nodes 1108, 1110, and 1112 are performed, thereby skipping convolution operations of kernels implemented or represented by the second nodes 1109 and 1111 and the output feature maps generated based on the first nodes 1103 through 1107. In an example, as noted above, even though convolution operations of one or more kernels implemented or represented by the second nodes 1109 and 1111 are not performed, i.e., they are skipped, a bias value may still be applied to or provided in an output or output feature map for each of the second nodes 1109 and 1111, so the respective outputs or output feature maps for the second nodes 1109 and 1111 may thus still be provided along with respective outputs or output feature maps from second nodes 1108, 1110, and 1112 as input feature maps to the third convolutional layer 1150.

As one or more kernels implemented or represented by nodes 1113, 1114, and 1117 of the third convolutional layer 1150 have been determined to be skip kernels, the convolutional operation of the third convolutional layer 1150 will not include convolution operations that could have been performed by the third nodes 1113, 1114, and 1117, e.g., such as when performed by similarly illustrated nodes in CNN 1101, with only the third nodes 1115 and 1116 being provided output feature maps generated based on or as the outputs of the second kernels 1108 through 1112, as indicated by arrows directed from the second nodes 1108 through 1112 toward only the third nodes 1115 among the third nodes 1113 through 1117 included in the third convolutional layer 1150. In this example, though the convolutional operation performed by the second convolutional layer 1140 did not include convolution operations corresponding to one or more kernels implemented or represented by second nodes 1109 and 1111, the convolutional operation of the third convolutional layer includes respective convolution operations performed between one or more kernels implemented or represented by the third nodes 1115 and 1116 and one or more output feature maps in the output of the second convolutional layer 1140 to which the aforementioned bias(es) were applied even though convolution operations corresponding to the one or more kernels implemented or represented by second nodes 1109 and 1111 were not implemented in the convolutional operation of the second convolutional layer 1140, as indicated by the example arrows directed from the skipped nodes 1109 and 1111.

Similar to the output of the second convolutional layer 1140, the output of the third convolutional layer may be generated based on output feature maps generated based on outputs of the third nodes 1113 through 1117, as indicated by arrows directed from the third kernels 1113 through 1117 to the output. In this example, though the convolutional operation of the third convolutional layer 1150 did not include convolution operations corresponding to the skipped target kernels implemented or represented by third nodes 1113, 1114, and 1117, the output of the third convolutional layer 1150 is generated based on respective output feature map(s) to which one or more biases have been respectively applied corresponding to the skip target kernels, as indicated by the respective arrows directed from the third nodes 1113, 1114, and 1117 toward the output. Here, for example, the skipping of convolution operations corresponding to respective skip target kernels implemented or represented by nodes 1109, 1111, 1113, 1114 and 1117, may include the respective convolutional operations of the respective conventional layers skipping corresponding MAC operations corresponding each skipped target kernel included in the CNN 1102 based on the kernel information, and performing the remaining MAC operations between kernel elements and kernels that are not skipped and the corresponding input elements of each convolutional layer. Though the discussion regarding CNNs 1101 and 1102 have been made with respect to skipped target kernels, the same discussion is similarly applicable to skipped kernel elements, where a node or connection implementing or representing the kernel element may be skipped based on respectively determined conditions of the kernels or kernel elements and/or corresponding kernel information. Through this, an amount of operations required for the convolution operation may be reduced when skipping of kernels or kernel elements are determined to be implemented, and thus, an operation speed performance may increase.

Figure 12:
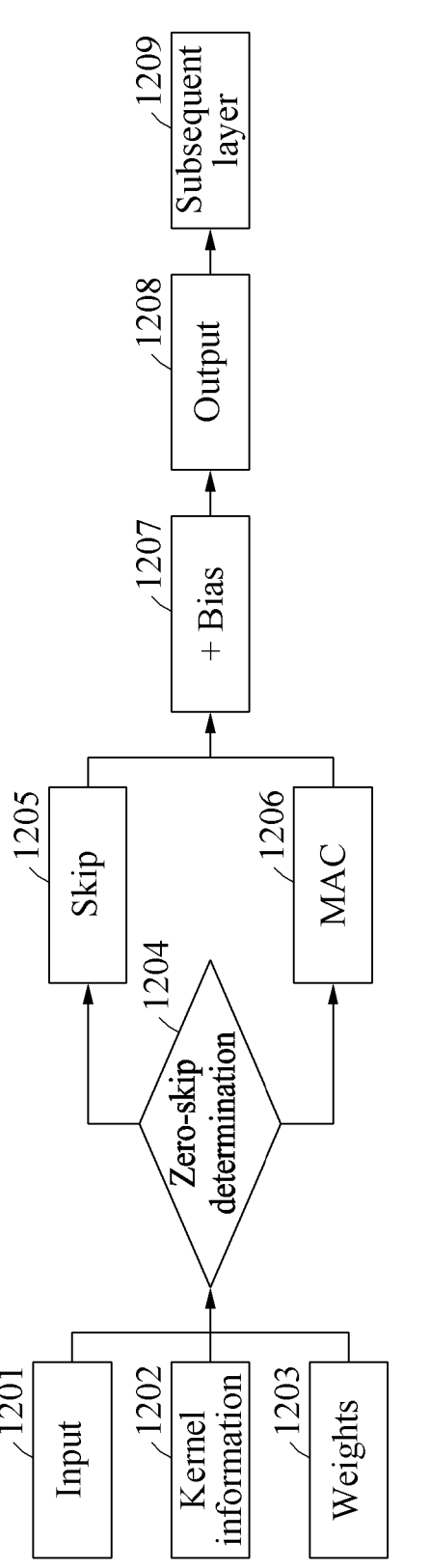
FIG. 12 is a flowchart illustrating an example of a CNN processing method in accordance with one or more embodiments.

FIG. 12 is a flowchart illustrating an example of a CNN processing method in accordance with one or more embodiments.

Referring to FIG. 12, a CNN processing apparatus acquires an input of a convolutional layer in operation 1201, acquires kernel information in operation 1202, and acquires weights in operation 1203. Here, the weights represent kernels and/or kernel elements, and may be acquired from a memory. Likewise, the input may be acquired by capturing information through a sensor, acquired from a long-term or temporary storage of such information, or from an output of a previous layer of the corresponding CNN, which may be stored in a memory upon completion or during operations of the previous layer or acquired in a temporary memory for the previous layer. In operation 1204, the CNN processing apparatus determines whether to skip at least one operation, e.g., a convolution operation, between the input and the weights based on the kernel information. In this example, the weights may be values of kernel elements applied in an MAC operation with an input element to generate the output, for example. For example, the CNN processing apparatus may selectively zero-skip a multiplication or multiplication and accumulation operation associated with a kernel element when the kernel element is determined to have a weight value of 0, or based on the kernel information. Based on a result of determination, the CNN processing apparatus may select to skips the operation between the input and the kernel weight in operation 1205 if the weight value is determined to be zero or may perform the MAC operation involving that kernel weight in operation 1206 if the weight value is determined to not be zero. In an example, MAC operations corresponding to additional kernel elements, in addition to the MAC operation corresponding to the kernel weight with the zero value, may additionally be skipped depending on the kernel information, as discussed above. In another example, the determination of whether to skip a MAC operation may be based on whether the example weight value is less than a minimum threshold, such that if the weight value is less than the minimum threshold then the CNN processing apparatus determines to skip the corresponding MAC operation. The CNN processing apparatus updates or adjusts respective output elements of the MAC operations, or of an output element of a skipped MAC operation, based on one or more biases corresponding to the kernel elements in operation 1207, generates an output 1208, and processes an operation corresponding to a subsequent layer in operation 1209. In an example, values of the one or more biases and their correspondence to kernel elements, kernels, or kernel set(s) may be stored in a memory of the CNN processing apparatus, e.g., as parameters of the corresponding CNN.

Figure 13:
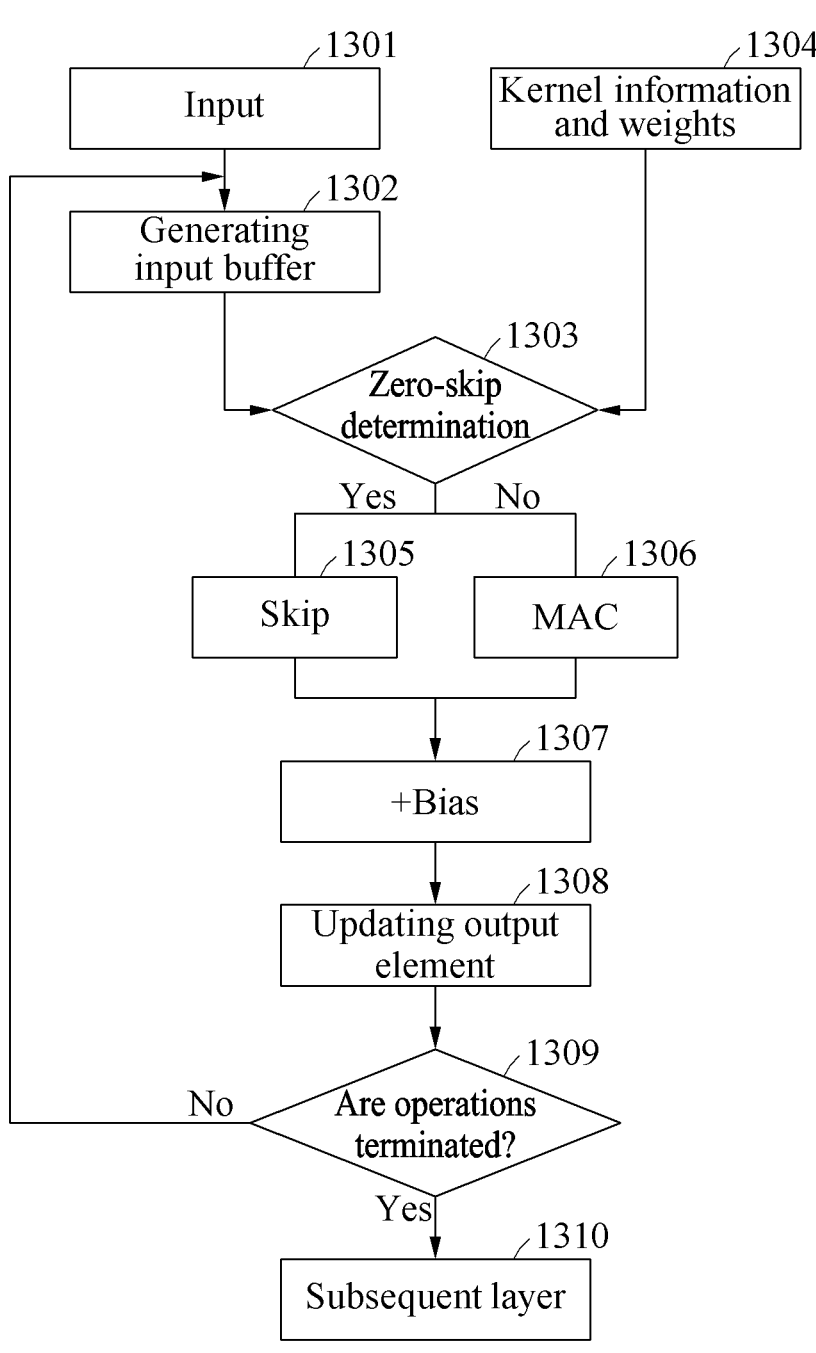
FIG. 13 is a flowchart illustrating an example of a CNN processing method in accordance with one or more embodiments.

FIG. 13 is a flowchart illustrating an example of a CNN processing method in accordance with one or more embodiments.

Referring to FIG. 13, a CNN processing apparatus may acquires an input of a convolutional layer in operation 1301, such as discussed above, and allocate an input buffer in operation 1302. The allocation of the input buffer may include any or selectively any of the input buffer allocation processes and methods discussed above with respect to FIGS. 1 through 6C.

In operation 1304, the CNN processing apparatus acquires kernel information and weights, such as discussed above with respect to FIG. 12. In operation 1303, the CNN processing apparatus determines whether to skip respective convolution operations between an input and at least one weight, as a kernel element, or plural weights, e.g., collectively as a kernel map or kernel, based on the kernel information. The descriptions of FIGS. 9 through 12 are also applicable to the example of determining whether to skip the respective convolution operation(s) and are not repeated here merely for brevity purposes. If a result of a corresponding determination is that the CNN processing apparatus is to respectively skip the weight or weights, the CNN processing apparatus skips convolution operation(s) between the input and the weight or weights in operation 1305, while performing the remaining convolution operations between the input and the remaining weights, or may performs the convolution operation(s) between the input and the weight or weights in operation 1306, and applies biases corresponding to kernel elements to output elements in operation 1307. In an example, each implemented convolution operation may be a MAC operation, such that when a weight is determined to be skipped then the corresponding MAC operation to perform the convolution with respect to the weight and the input is not performed, while the MAC operation with respect to the weight and the input may otherwise be performed when the weight is not skipped.

In operation 1308, the CNN processing apparatus updates at least one output element in an output of a convolutional layer based on a result of the at least one operation of the convolutional layer. The descriptions of FIGS. 7 and 8 are also applicable to the example of updating the at least one output element, and thus as non-limiting examples, operation 1308 may include any one, combination, or all operations discussed above with respect to FIGS. 7 and 8. In operation 1309, the CNN processing apparatus determines whether operations corresponding to a current convolutional layer are completed. In operation 1310, the CNN processing apparatus processes an operation corresponding to a subsequent layer based on a result of determination and dependent on the final output of the current convolutional layer.

Figure 14:
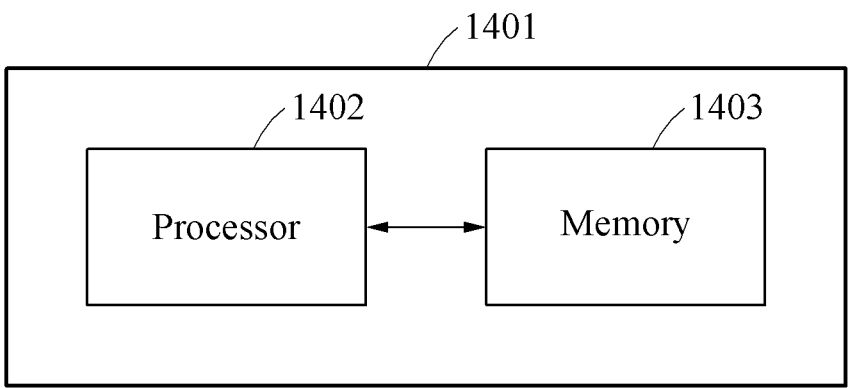
FIG. 14 is a block diagram illustrating an example of a CNN processing apparatus in accordance with one or more embodiments.

FIG. 14 is a block diagram illustrating an example of a CNN processing apparatus in accordance with one or more embodiments.

Referring to FIG. 14, a CNN processing apparatus 1401 includes a processor 1402 and a memory 1403. The processor 1402 is configured to perform any one, any combination, or all operations described herein with respect to FIGS. 1 through 15. The CNN processing apparatus 1401 may also correspond to any of the computing or CNN processing apparatuses described herein with respect to FIGS. 1 through 13 and 15. The memory 1403 stores at least one of features of inputs and/or features of kernels of one or more convolutional layers. In addition, the memory may be non-transitory computer readable media that stores instructions, which when implemented by the processor 1401, cause or control the processor 1401 to be configured as any one, any combination, or selectively all of the CNNs or convolutional layers discussed herein. Still further, the memory may be non-transitory computer readable media that stores instructions, which when implemented by the processor 1401, cause or control the processor 1401 to be implement any one, any combination, or all of the operations or methods described herein. The memory 1403 includes a volatile memory or a non-volatile memory.

The processor 1402 may be configured to control the CNN processing apparatus 1401 to perform any one, any combination, or all operations described herein, and/or the CNN processing apparatus 1401 may be configured as any of the convolutional layers or CNNs described herein. The CNN processing apparatus 1401 may be connected to an external device, for example, a personal computer, mobile device, or a network, through an input/output device, and may exchange data with the external device. The CNN processing apparatus 1401 may also be representative of such a device, for example, the personal computer, mobile device, or network, as non-limiting examples.

Accordingly, as discussed herein, the CNN processing apparatus 1401 may be configured to implement a CNN acceleration that selectively processes or implements convolution operations of a trained CNN based on select storing and implementation of input and trained parameters, such as through respective select interleaved or interleaved and reorganized storage schemes, and may implement selective skipping of convolutional operations for one or more trained objectives of the CNN at a high speed. In addition, the CNN processing apparatus may include, or be representative of, a neural processing unit (NPU), a vision processing unit (VPU) to control a corresponding dedicated processor, or a TrustZone dedicated processor and/or memory environment, as only examples and noting that alternatives are also available. Thus, the CNN processing apparatus 1001 uses or is representative of, or available for use in, a variety of hardware depending on varied embodiment, and thus is not limited to the examples discussed herein. In an example, with any of the aforementioned select storing and implementation schemes, as well as any of the discussed kernel element or kernel skipping discussed herein, an objective of an example convolutional layer or CNN may be achieved with reduced memory and/or processing requirements over previous loading and convolution implementations, as well as with an increase processing speed through reducing of a total convolution operation count, e.g., total operation count of MACs, for example, over a typical operation count of MAC where input elements are required to be reloaded for every related convolution operation and/or where all MAC operations are required to be performed even when the results of the corresponding MAC operation does not substantially or sufficiently affect a final output. Thus, as only an example, one or more examples may also be suitable as or for an embedded terminal or in environment using limited resources.

Figure 15:
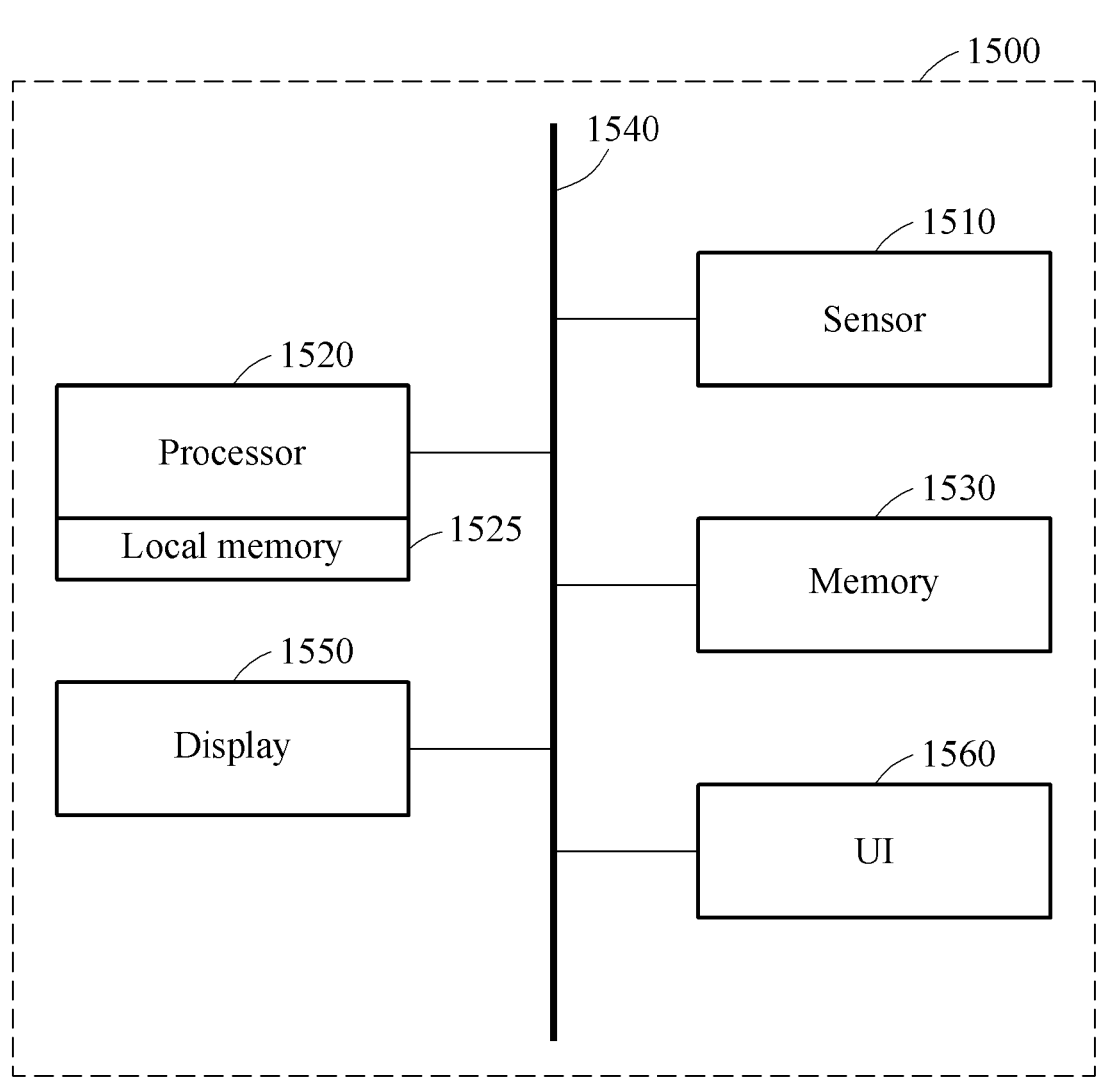
FIG. 15 is a block diagram illustrating an example of a computing apparatus in accordance with one or more embodiments.

FIG. 15 is a diagram illustrating an example of an electronic system or device configured to implement a CNN.

Referring to FIG. 15, an electronic system or device 1500 includes a sensor 1510, a processor 1520, a local memory 1525, a memory 1530, a display 1550, and a user interface (UI) 1560. The sensor 1510, the processor, 1520, the memory 1530, the display 1550, and the UI 1560 communicate with each other via a bus 1540. The electronic system or device 1500 may correspond to any one or more or all of the above CNN processing apparatuses and implement any one or more or all of the above CNN processing processes or methods. As a non-limiting example, the processor 1520 may correspond to processor 1402 of FIG. 14, and/or the memory 1530 may correspond to the memory 1403 of FIG. 14. The local memory 1525 (and/or the memory 1530) may correspond to any of the above described input buffers or temporary or local buffers/memories, including buffers that store selectively ordered or arranged input elements and/or kernel elements as well as temporary or final output values of a convolutional layer or the CNN. In an example, the memory 1530 may store a database from which kernel elements and/or image elements may be loaded from and into the local memory 1525, e.g., into input buffers or buffers that store kernel elements or into memories 502, 503, 602, or 603 in the memory 1530 or local memory 1525. Thus, in an example, the selectively stored kernel elements and/or image elements, e.g., depending on storing scheme selected by the CNN processing apparatus, such as in memories 502, 503, 602, or 603 may be stored in the local memory 1525 and/or the memory 1530. In an example, the local buffers/ memories may be memories of the processor 1520 or buffers/memories directly connected to the processor 1520, e.g., configured for rapidly transferring data to/from the processor 1520 and the local memory 1525, noting that alternatives are also available. The local memory 1525 may further be allocated to temporarily store convolutional output results of a particular layer of the CNN, or all layers of the CNN, the ultimate output results of which may be stored in the memory 1530 and/or respectively used for inputs to a next layer for which such results or temporary results may be store in the local memory 1525 and/or memory 1530. In an example, except for purposes of an input to a next layer, the convolutional results of each layer may otherwise be discarded upon determined completion of a corresponding convolutional layer, and only final layer(s) output results of the CNN stored to the memory 1530 or used for another process, such as in an example where the electronic system or device 1500 controls the implementation of the CNN in an unlocking and corresponding display operation of a mobile phone as the electronic system or device 1500 when the final output indicates a successful face verification and the success is displayed using display 1550. The electronic device may alternatively control implementation of the CNN for alternative objectives, such as for speech, voice, or image recognition, battery state estimation, as well as other objectives of the respectively trained CNN and varied embodiments, and may display or otherwise explicitly indicate the results of the CNN implementation and/or otherwise inferentially indicate the results, such as by not providing additional display, by not performing other operations, or by performing such other operations of the electronic device or system 1500. Thus the electronic system or device 1500 may indicate, e.g., either through explicit or inferential indications, results of the implementation of the CNN.

Herein, described temporary buffers/memories may be of general purpose memory, or in an example the temporary buffers/memories may be a memory of a dedicated or secure process, processor, or processing component of the electronic device or system 1500, e.g., where processor 1520 is such a processor or processing component, and such as where a limited Trust Zone of a CPU processor of the CNN processing apparatus is utilized to implement a corresponding neural network for a trained objective of the example CNN or a dedicated or secure processing element/component separate from such CPU processors is utilized to implement the corresponding neural network. As only an example, such limited Trust Zone of the example CPU processor or dedicated or secure processing element/component for example may be implemented when private information is being interpreted or interpreted for, such as in fingerprint or image verification embodiments. Such limited Trust Zones of a CPU processor or such dedicated or secure processing element/component may typically have limited memory resources and/or processing capabilities, and thus, one or more examples may be used with such limited Trust Zones or dedicated or secure processing element/component examples to implement objectives of a trained neural network with reduced resources and/or processing complexities. Non-limiting examples of such trained objectives may be for bio-information, bio-image, facial, or voice verifications, bio-information, bio-image, facial, speech, image, scene, or situation recognitions, or any other non-limiting alternative objectives. For example real-time recognition or verification with such alternative operation examples discussed herein may be available with less computing resources and/or processing requirements, such as where such computing resources and/or processing capabilities are limited, providing further alternative operation examples of technological improvements of the examples herein over instances where such trained neural network are normally implemented without the aforementioned alternative storing and/or skipping schemes described above, as only examples. As also noted, the processor 1520 may represent one or more processors that are configured as any or any combination of the above CNN processing apparatuses, and any recognition apparatuses, rejection apparatuses, and/or verification apparatuses discussed herein, as non-limiting examples.

The sensor 1510 includes, for example, a microphone and/or an image sensor or camera to sense video data and audio data to recognize, reject, or verify an object, for example. The sensor 1510 senses an image using a well-known scheme, for example, a scheme of converting an optical image to an electronic signal. An output of the sensor 1510 is transferred to the processor 1520 or the memory 1530, and output of the sensor 1510 may also be transferred directly to, or operate as, an input layer of any of the CNNs discussed herein.

The processor 1520 may be configured to perform one or more or all processes described with reference to FIGS. 1 through 15. For example, to perform a recognition, rejection, or verification operation, the processor 1520 may recognize, reject, or verify the input data based on the CNN processing operations described above with respect to FIGS. 1-15, which may also be considered acceleration processes that produce an accelerated neural network implementation, for example. The result of any of such recognition, rejection, or verification operations may be output through the display 1550. In addition, any user adjustments or selective operations of the CNN processing operations discussed herein may be provided by UI 1560, which may include a touch screen or other input device/system. As noted above, the processor 1520 may also be, or include, a graphics processor unit (GPU), reconfigurable processor, or have any other type of multi- or single-processor configuration.

In addition to operations of one or more of the CNN processing apparatuses and/or operations described in FIGS. 1-15, as noted above, the memory 1530 may further store instructions which, when executed by processor 1520, cause the processor 1520 to perform additional operations, functions, and controls of the electronic system or device 1500, such as a user interface of the electronic system. The electronic system or device 1500 may be connected to an external device, for example, a personal computer (PC) or a network, via an input/output device of the electronic system, to exchange data with the external device. The electronic system or device 1500 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control.

The respective processors, CNN processing apparatuses, the input buffers, local or temporary buffer or memories, general or main memories or databases, the memories 502, 503, 602, and 603, classifier, fully connected layer(s), sub-sampling layer, convolutional layers, CNNs, CNN processing apparatus 1401, processor 1402, memory 1403, electronic system or device 1500, bus 1540, processor 1520, local memory 1525, sensor 1510, memory 1530, display 1550, and user interface 1560, as only examples, in FIGS. 1-15 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented convolutional neural network (CNN) processing method comprising:
   implementing a convolutional layer of a neural network by:
      acquiring at least one convolution operation result between at least one kernel element and at least one input element of an input of the convolutional layer wherein the at least one input element is loaded from a memory storing input elements interleaved by channel according to a horizontal or vertical rasterizing scheme to reduce overlapping data loads during convolution operations; and
      generating an output of the convolutional layer based on the at least one operation result by mapping the at least one operation result to an output feature map to which padding is applied based on a size of a pad predetermined to correspond to an input of a subsequent convolutional layer of the convolutional layer in the neural network,
      wherein the generating of the output in consideration of the size of the pad enables skipping of operations on the applied padding when performing convolution operations of the subsequent convolutional layer based on kernel information indicating skip targets pre-classified from kernel elements, thereby reducing a number of the convolution operations and computational resources required for processing the subsequent convolutional layer.

2. The method of claim 1, wherein a size of the output is defined based on a size of the input of the subsequent convolutional layer, and
   padding is applied to the input of the subsequent convolutional layer based on the size of the pad.

3. The method of claim 1, wherein the output of the convolutional layer includes at least one output feature map corresponding to at least one output channel, and
   the generating of the output includes mapping the at least one operation result on an output feature map, of the at least one output feature map, to which padding is applied based on the size of the pad.

4. A convolutional neural network (CNN) processing apparatus comprising:
   one or more processors configured to implement a convolutional layer of a neural network, through the one or more processors being configured to:
      acquire at least one convolution operation result between at least one kernel element and at least one input element of an input of a convolutional layer, wherein the at least one input element is loaded from a memory storing input elements interleaved by channel according to a horizontal or vertical rasterizing scheme to reduce overlapping data loads during convolution operations; and
      generate an output of the convolutional layer based on the at least one operation result by mapping the at least one operation result to an output feature map to which padding is applied based on a size of a pad predetermined to correspond to an input of a subsequent convolutional layer of the convolutional layer in the neural network,
      wherein the generating of the output in consideration of the size of the pad enables skipping of operations on the applied padding when performing convolution operations of the subsequent convolutional layer based on kernel information indicating skip targets pre-classified from kernel elements, thereby reducing a number of the convolution operations and computational resources required for processing the subsequent convolutional layer.

5. The method according to claim 1, comprising:

determining a loading space unit for the input based on a direction of storing input elements of an input feature map of the input and an extent of a dimension of a kernel feature map; and sliding the loading space unit across the input in units of a predetermined stride to load respective target loading spaces of the input from a memory into one or more respective input buffers, wherein the implementing of the convolutional layer includes performing respective convolution operations between each loaded respective target loading space stored in the one or more respectively allocated input buffers and kernel elements of a kernel of the convolutional layer.

6. The method of claim 5, wherein the loading space unit is a third order tensor.

7. The method of claim 5, wherein the performing of the respective convolution operations includes selectively not performing all convolution operations of the convolutional layer based on one or more determined skip target kernel elements or one or more determined skip target kernels.

8. The method of claim 5, further comprising performing the respective allocating of the one or more input buffers to each have a length equal to a size of the loading space unit.

9. The method of claim 8, wherein the determining of the loading space unit includes:

determining an extent of a first dimension of the loading space unit to be a total number of channels of the input, of a corresponding kernel of the kernel feature map, or of the kernel or of another kernel of a kernel set corresponding to the convolutional layer;

determining an extent of a second dimension of the loading space unit to be the extent of the dimension of the kernel feature map; and determining an extent of a third dimension of the loading space unit to be a height or a width of the input feature map, and wherein the size of the loading space is the determined extent of the first dimension, the determined extent of the second dimension, and the determined extent of the third dimension.

10. The method of claim 1, wherein the loading of the respective target loading spaces of the input from the memory includes sequentially loading the input elements from the memory, the memory storing first input elements corresponding to a first height and width position, of the input and of different input feature maps, interleaved by channel so as to be consecutively stored in the memory, followed by second input elements corresponding to a next height or width position, of the input and of the different input feature maps, interleaved by channel so as to be next consecutively stored in the memory.

11. The method of claim 10, wherein the performing of the respective convolution operations includes sequentially loading the kernel elements from another memory, the kernel elements being stored in the other memory based on the loading space unit, with the other memory storing a first kernel element corresponding to a second height and width position, of the kernel and of different channels, interleaved by channel so as to be consecutively stored in the other memory, followed by a second kernel element corresponding to a next height or width position, of the kernel and of the different channels, interleaved by channel so as to be next consecutively stored in the other memory.

12. The method of claim 10, wherein the respectively interleaved input elements are consecutively stored in the memory according to a horizontal rasterizing scheme.

13. The method of claim 10, wherein the respectively interleaved input elements are consecutively stored in the memory according to a vertical rasterizing scheme.

\* \* \* \* \*